(12) United States Patent
Doi

(10) Patent No.: US 6,332,078 B1
(45) Date of Patent: Dec. 18, 2001

(54) RECEIVER DEVICE AND RECEIVING CHANNEL SETTING METHOD

(75) Inventor: Manabu Doi, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/080,701

(22) Filed: May 18, 1998

(30) Foreign Application Priority Data

May 22, 1997 (JP) .................................................. 9-132384
Jun. 12, 1997 (JP) .................................................. 9-154870

(51) Int. Cl.[7] .................................................. H04Q 7/20
(52) U.S. Cl. .................. 455/434; 455/432; 455/435; 455/436; 455/515; 455/67.1; 455/226.2
(58) Field of Search .................................... 455/432, 422, 455/458, 434, 450, 452, 515, 436, 437, 438, 439, 464, 511, 512, 513, 67.1, 67.3, 435, 488, 226.2

(56) References Cited

U.S. PATENT DOCUMENTS

| | | |
|---|---|---|
| 5,065,423 | 11/1991 | Gaskill . |
| 5,262,769 | 11/1993 | Holmes . |
| 5,537,100 | 7/1996 | Hallberg . |
| 5,610,919 | 3/1997 | Willard et al. . |
| 5,983,115 | * 11/1999 | Mizikovsky ........................ 455/512 |
| 5,987,324 | * 11/1999 | Peranto et al. ...................... 455/434 |
| 5,995,834 | * 11/1999 | Moore ................................. 455/434 |
| 6,006,107 | * 12/1999 | Tomioka et al. ..................... 455/552 |
| 6,011,960 | * 1/2000 | Yamada et al. ........................ 455/77 |
| 6,016,427 | * 1/2000 | Barber et al. ........................ 455/434 |
| 6,134,445 | * 10/2000 | Gould et al. ......................... 455/456 |
| 6,185,422 | * 2/2001 | Mattila ................................ 455/434 |

FOREIGN PATENT DOCUMENTS 0 279 697    8/1988   (EP) .

* cited by examiner

Primary Examiner—Dwayne Bost
Assistant Examiner—Temica M. Davis
(74) Attorney, Agent, or Firm—Frishauf, Holtz, Goodman, Langer & Chick, P.C.

(57) ABSTRACT

A receiver device, in which the receiving channel can be changed over to another, includes an RF unit which receives a plurality of channel frequency signals, a frequency conversion unit, an intermediate frequency amplifier and an FM detection unit, a signal intensity detection unit which, when the mode for setting the receiving channel is set, scans the channel frequencies to detect the signal intensities of the received signals in the respective channels and an A/D converter, a RAM which successively stores therein the signal intensities in the respective channels, and a CPU which sets the receiving channels on the basis of the signal intensities stored, detects the channel information contained in the received signals, and sets, when the detected channel information is the channel information of the desired channel, the channel of the channel information as the receiving channel for ordinary communications. Thus, the speed at which the change of the receiving channel and the registration process are established when the user is moving across service areas is enhanced to eliminate the feeling of uneasiness of the user and to shorten the length of time during which the user can receive no paging service.

9 Claims, 26 Drawing Sheets

FIG.3

| CHANNEL FREQUENCY (CH) | BIT RATE DETECTION RESULT | SIGNAL INTENSITY DETECTION RESULT (dBμm) |
|---|---|---|
| F1 | | |
| F2 | | |
| F3 | | |
| ⋮ | ⋮ | ⋮ |
| Fn | | |

62

| CHANNEL NO. (CH) | CHANNEL FREQUENCY (F) | AREA CODE | AREA NAME (DISPLAY CONTENTS) | AREA NO. | NID |
|---|---|---|---|---|---|
| 4 | F4 | A | KANAGAWA | 140 | NID1 |
| 5 | F5 | B | TOKYO | 130 | NID1 |
| 6 | F6 | C | CHIBA | 120 | NID1 |

CHM

FIG.6

| CHANNEL FREQUENCY | SIGNAL INTENSITY | DETECTION FRAME NO. | SSID (LID) | NID | OVERLAP OR NOT | FRAME OFFSET NUMBER |
|---|---|---|---|---|---|---|
| | | | 65 | | | |
| ---------- | ---------- | ---------- | ---------- | ---------- | ---------- | ---------- |

FIG.8

| CHANNEL FREQUENCY (CH) | BIT RATE DETECTION RESULT | SIGNAL INTENSITY DETECTION RESULT (dBµm) |
|---|---|---|
| F1 | NG | 12 |
| F2 | NG | 25 |
| F3 | NG | 30 |
| F4 | OK | 54 |
| F5 | OK | 55 |
| F6 | OK | 60 |
| F7 | OK | 35 |
| F8 | OK | 48 |
| ⋮ | ⋮ | ⋮ |
| Fn | NG | 2 |

FIG.11

| CHANNEL FREQUENCY | SIGNAL INTENSITY | DETECTION FRAME NO. | SSID (LID) | NID | OVERLAP OR NOT | FRAME OFFSET NUMBER |
|---|---|---|---|---|---|---|
| F6 | 60 | 10 | | | | |
| F5 | 55 | 30 | | | | |
| F4 | 54 | 7 | | | | |

65

| CHANNEL NO. (ch) | CHANNEL FREQUENCY (F) | LOCAL CHANNEL ID (LID) | NETWORK ID (NID) | AREA CODE | AREA NAME (DISPLAY CONTENTS) | AREA NO. |
|---|---|---|---|---|---|---|
| 1 | F1 | LID1 | NID1 | A | SEISHOU | 141 |
| | | LID2 | | D | CYUBU (OOTSUKI) | 202 |
| 2 | F2 | LID3 | | B | TAMA | 131 |
| 3 | F3 | LID2 | | D | CYUBU (SUWA) | 201 |
| | | LID4 | | C | CHIBA (WEST) | 121 |
| 4 | F4 | LID1 | | A | KANAGAWA | 140 |
| 5 | F5 | LID3 | | B | TOKYO | 130 |
| 6 | F6 | LID4 | | C | CHIBA (EAST) | 120 |
| 7 | F7 | LID2 | | D | CYUBU (KOHU) | 200 |
| 8 | F8 | LID5 | | E | SAITAMA | 110 |

CHM

FIG.16

| CHANNEL FREQUENCY (CH) | BIT RATE DETECTION RESULT | SIGNAL INTENSITY DETECTION RESULT (dBµm) |
|---|---|---|
| F1 | OK | 35 |
| F2 | OK | 65 |
| F3 | OK | 48 |
| F4 | OK | 32 |
| F5 | OK | 63 |
| F6 | OK | 52 |
| F7 | OK | 25 |
| F8 | OK | 28 |
| ⋮ | ⋮ | ⋮ |
| Fn | NG | 2 |

| CHANNEL FREQUENCY | SIGNAL INTENSITY | DETECTION FRAME NO. | SSID (LID) | NID | OVERLAP OR NOT | FRAME OFFSET NUMBER |
|---|---|---|---|---|---|---|
| F2 | 65 | 10 | | | | |
| F5 | 63 | 30 | | | | |
| F6 | 52 | 7 | | | | |
| | | | | | | |

| CHANNEL FREQUENCY | SIGNAL INTENSITY | DETECTION FRAME NO. | SSID (LID) | NID | OVERLAP OR NOT | FRAME OFFSET NUMBER |
|---|---|---|---|---|---|---|
| F2 | 65 | 10 | | | | |
| F5 | 63 | 30 | | | | |
| F6 | 52 | 7 | LID4 | NID1 | | 0 |

| CHANNEL FREQUENCY | SIGNAL INTENSITY | DETECTION FRAME NO. | SSID (LID) | NID | OVERLAP OR NOT | FRAME OFFSET NUMBER |
|---|---|---|---|---|---|---|
| F2 | 65 | 10 | | | | |
| F5 | 63 | 30 | LID3 | NID1 | | 0 |
| F6 | 52 | 7 | LID4 | NID1 | | 0 |
| | | | | | | |

| CHANNEL FREQUENCY | SIGNAL INTENSITY | DETECTION FRAME NO. | SSID (LID) | NID | OVERLAP OR NOT | FRAME OFFSET NUMBER |
|---|---|---|---|---|---|---|
| F2 | 65 | 10 | LID3 | ----- | | 0 |
| F5 | 63 | 30 | LID3 | NID1 | | 0 |
| F6 | 52 | 7 | LID4 | NID1 | | 0 |
| | | | | | | |

FIRST CODE WORD

| x (4bit) | p (4bit) | a | v (6bit) | d | m (3bit) | CHECK BIT (INCLUDING EVEN PARITY) (11bit) |
|---|---|---|---|---|---|---|

2bit      2bit

FIG.28

SECOND TO FOURTH CODE WORD

| x (4bit) | f (3bit) | s (14bit) | CHECK BIT (INCLUDING EVEN PARITY) (11bit) |
|---|---|---|---|

FIG.29

WHEN -1 : f = 111 (SSID1)

| x (4bit) | 111 | LOCAL CHANNEL ID (9bit) | COVERAGE ZONE (5bit) | CHECK BIT (INCLUDING EVEN PARITY) (11bit) |
|---|---|---|---|---|

FIG.30

WHEN -2 : f = 000 (SSID2)

| x (4bit) | 000 | COUNTRY ID CODE (10bit) | ROMING TRAFFIC FLAG (4bit) | CHECK BIT (INCLUDING EVEN PARITY) (11bit) |
|---|---|---|---|---|

RECEIVER DEVICE AND RECEIVING CHANNEL SETTING METHOD

BACKGROUND OF THE INVENTION

The present invention relates to a receiver device such as, a paging receiver or the like utilizing, for instance, a multi-area roaming service in paging services, and a receiving channel setting method used therefor.

This application is based on Japanese Patent Application No.9-132384, filed May 22, 1997 and Japanese Patent Application No. 9-154870, filed Jun. 12, 1997, the contents of which are incorporated herein by reference.

Generally, paging receivers are becoming widely popular even among youths, and recently, in paging systems represented by the high-grade radio paging system (RCR STD-43 Standard), the service areas in the whole of a country are covered by 36 channel frequencies, whereby a so-called multi-area roaming service is achieved according to which it is possible for a user to receive a message addressed to the user wherever the user may be.

FIG. 26 shows the format of the transmitting data in this high-grade paging system, wherein data divided by cycle numbers "No. 0"–"No. 14" is transmitted in one hour, and further, in each of the cycles, 128 frames numbered as "No. 0"–"No. 127" are transmitted.

The respective frames, which each correspond to 1.875 [sec], are each comprised of a first synchronizing portion S1, a frame information FI, a second synchronizing portion S2, a block information BI, an address field AF, a vector field VF, a message field MF and an idle block IB in this order.

In the frame information FI, there is contained a cycle number, a frame number, a roaming network bit RNB. The cycle number and the frame number indicate that the frame is included in which frame and cycle. The roaming network bit is an identification bit indicating whether or not the channel has a roaming service. If the roaming network bit is "1", it indicates that the channel has a roaming service.

If the user is in a service area where the paging service company provides a multi-area roaming service, a network identifier NID is set in the address field AF in every 8 frames. Stated another way, the NID is set in the frame number which is a modulo 8 of (M+N+C). Here, M is a modulo 8 of an integer part of a division of channel frequency by channel interval, N is a modulo 8 of the network address, and C is the cycle number. If the user changes the service area to a new one, the user receives the NID of the area in which he wants to receive a message, whereby the receiver is adjusted to the channel frequency to which this NID is set, and then, he or she transmits to the exchange for this service area, by the use of the nearest telephone set or the like, the service code of the multi-area roaming service, the password previously determined through the exchange in this service area, and the area No. of the area in which the service is to be received. Thus, the registration of the service area is finished.

In the transmitting data format of the multi-area roaming service, a local identifier LID is set separately from the NID; it is set in one of the second to fourth code words of the block information BI in every frame.

FIG. 27 shows the data format of the first code word of the block information BI which comprises check bits×(4 bits), a word number p (4 bits) of the priority address of the address field AF, a termination word a (2 bits) of the block information BI, a start word v (6 bits) of the vector field VF, a frame continuation flag d (2 bits), a variable receiving cycle value m (3 bits), and check bits (11 bits) including an even parity.

On the other hand, FIG. 28 shows the data format of the second to fourth code words of the block information BI, which comprises check bits×(4 bits), a format type f (3 bits), data s (14 bits), and check bits (11 bits) including an even parity.

If the value of the format type f is "111", SSID1 comprising a local channel identifier LID (9 bits) and a coverage zone (5 bits) are set in the data s as shown in FIG. 29. If the value of the format type f is "000", SSID2 consisting of a country identification code (10 bits) and a roaming traffic flag (4 bits) are set in the data s.

The SSID1 and SSID2 are both set as a pair in the block information BI, and, as for the LID thereof, the same one is set if a plurality of receiving channels are used in one service area.

However, if the change of the service area and the area registration are performed in a paging service in which the multi-area roaming service is provided by the use of such data formats as mentioned above, the user receiver terminal sweeps the respective channels until the NID is detected, in accordance with the scan list of the channel frequency to be received, which has been previously set as ID information, without regard to environmental circumstances such as "the radio waves of what channel frequencies are arriving around him" and "whether the data of the desired bit rate can be received". As a result, there is caused the inconvenience that a very long time such as, for example, more than one minute, is spent for the setting of the receiving channel, during which period the user always feels uneasy, wondering if he can receive the paging service in the particular service area.

BRIEF SUMMARY OF THE INVENTION

Accordingly, it is an object of the present invention to provide a receiver device and a receiving channel setting method in which the receiving-channel changing process and the registration process to be performed when the user is moving through service areas can be finished in a shorter time to eliminate the feeling of uneasiness of the user and to shorten as much as possible the period of time when the user cannot receive the paging service.

The above object can be achieved by the following receiver device and receiving channel setting method.

According to a first aspect of the present invention, there is provided a receiver device capable of changing a receiving channel, comprising receiving means for receiving a plurality of channel signals; setting means for setting a change mode in which receiving channels of the receiving means are changed; channel detection means which, when the change mode is set by the setting means, successively scans the receiving channels of the receiving means to detect candidate channels in which a signal bit rate is a desired bit rate; memory means for storing the candidate channels detected by the channel detection means; channel information detection means which selects some of the candidate channels stored in the memory means based on a predetermined priority and detects channel information included in a received signal of the selected channels; and received channel setting means which, when the channel information detected by the channel information detection means is channel information of a desired channel, sets the channel including the channel information of the desired channel as the received channel.

According to a second aspect of the present invention, there is provided the receiver device according to the first aspect, which further comprises signal intensity detection means for detecting signal intensities of the channels, and in which the received channel setting means sets the received channel in consideration with the detected signal intensities.

According to a third aspect of the present invention, there is provided the receiver device according to the aspect 2, in which the memory means stores the channel information detected by the channel information detection means and the signal intensities detected by the signal intensity detection means in association with each other.

According to a fourth aspect of the present invention, there is provided the receiver device according to one of the first to third aspects, in which the channel information is transmitted at a predetermined interval, which further comprises means for detecting which channel transmits the channel information earliest, and in which the channel information detection means sets a channel in which the channel information is detected based on the detection result of the detecting means.

According to a fifth aspect of the present invention, there is provided the receiver device according to one of the first to third aspects, in which the channel information includes a first channel information which is transmitted at a predetermined frame interval and a second channel information which is transmitted in every frame, and which further comprises channel information memory means for storing the first channel information and the second channel information, which are detected by the channel information detection means, by associating the first and second channel information with the channels; determining means which, when the second channel information is detected by the channel information detection means, determines whether or not the second channel information is identical with the second channel information stored together with the first channel information in the channel information memory means; instruction means which, if it is determined by the determining means that the second channel information are identical with each other, instructs whether or not the second channel information is the channel information of the desired channel; and control means which, if it is instructed, by the instruction means, that the second channel information is the channel information of the desired channel, controls the received channel setting means so as to set, as the received channel, the channel in which the second channel information is contained.

According to a sixth aspect of the present invention, there is provided the receiver device according to one of the first to fifth aspects, further comprising display means for displaying the channel information detected by the channel information detection means.

According to a seventh aspect of the present invention, there is provided a receiving channel setting method comprising the following steps of scanning a plurality of frequency signals and storing a plurality of predetermined bit rate frequency signals as receivable signals; selecting, from among the plurality of signals stored at the scanning and storing step, signals based on a predetermined order to demodulate the selected signals and detecting channel information in the demodulated signals; and setting, when the channel information detected by the selecting and detecting step is desired channel information, the frequency of the signal including the channel information of the desired channel as the received channel.

According to an eighth aspect of the present invention, there is provided the method according to the seventh, in which the predetermined order is a descending order of the signal intensities.

According to a ninth aspect of the present invention, there is provided the method according to the seventh, in which the predetermined order is an order in which the channel transmitting the channel information earliest has a higher priority.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 is a diagram showing the constitution of the receiving state setting area of the RAM shown in FIG. 2;

FIG. 6 is a diagram showing the items of memory contents of the list memory shown in FIG. 2;

FIG. 8 is a diagram showing the memory contents of the receiving state setting area of the RAM according to the first embodiment;

FIG. 11 is a diagram showing the list memory according to the first embodiment;

FIG. 16 is a diagram showing the receiving state setting area of the RAM according to the third embodiment;

FIG. 17 is a diagram showing the list memory according to the third embodiment;

FIG. 20 is a diagram showing the list memory according to the third embodiment;

FIG. 21 is a diagram showing the list memory according to the third embodiment;

FIG. 22 is a diagram showing the list memory according to the third embodiment;

FIG. 27 is a diagram showing the data format of the first code word of the block information BI shown in FIG. 26;

FIG. 28 is a diagram showing the data format of the second to eighth code words of the block information BI shown in FIG. 26;

FIG. 29 is a diagram showing the data format if the format type shown in FIG. 28 is "111" (SSID1); and FIG. 30 is a diagram showing the data format if the format type shown in FIG. 28 is "000" (SSID2).

DETAILED DESCRIPTION OF THE INVENTION

A preferred embodiment of a receiver device according to the present invention will now be described with reference to the accompanying drawings.

First Embodiment

A first embodiment in which the present invention is applied to a paging receiver 100 which utilizes the paging service by a high-grade paging system will now be described with reference to the drawings.

Figure 1:
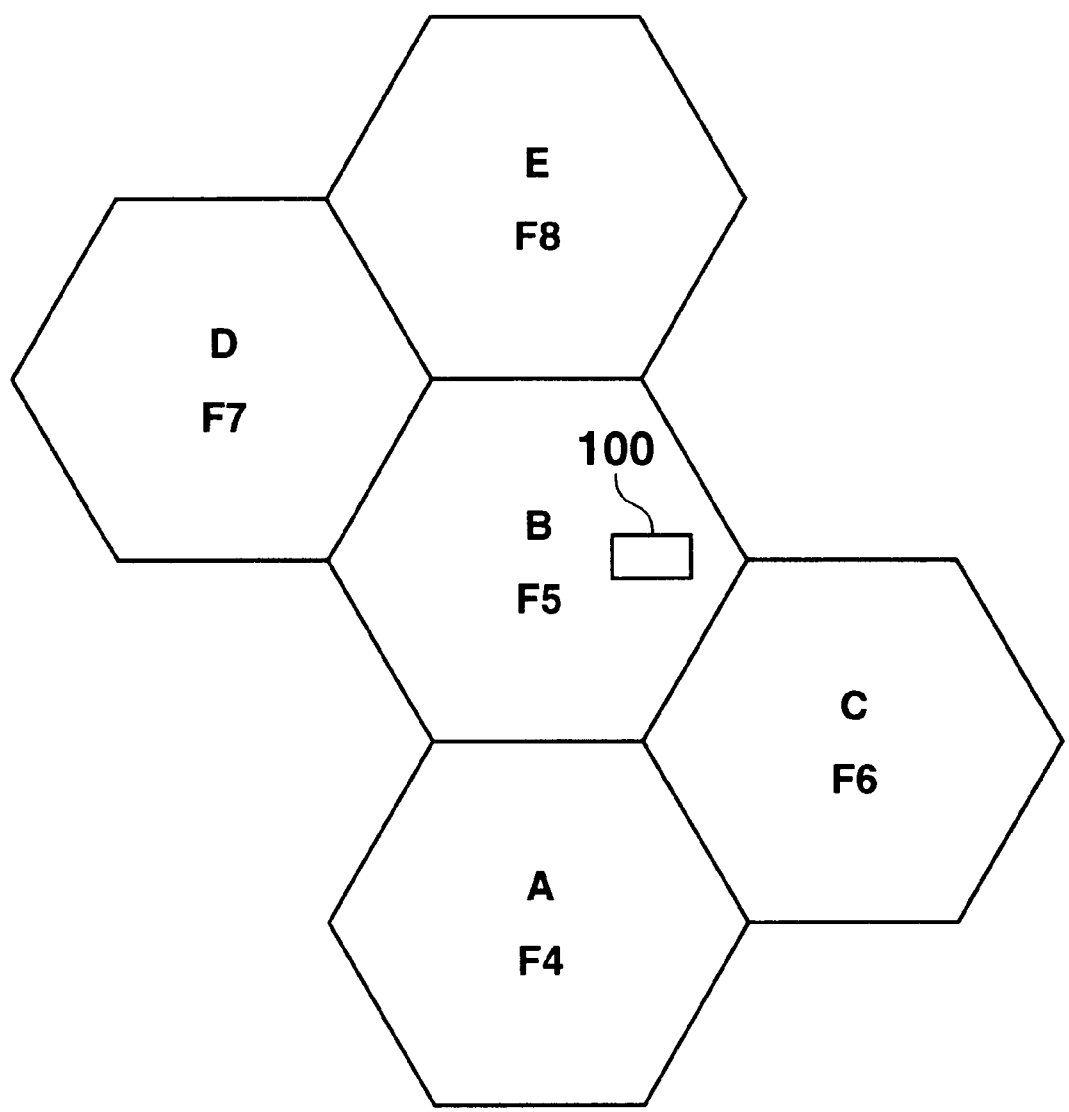
FIG. 1 is a diagram showing how the service areas according to a first embodiment of the present invention are arranged adjacent to one another.

FIG. 1 shows a service area B in which the paging receiver 100 is located at present and service areas A, C, D and E located adjacent thereto. In the service areas A, C, D and E, the same NID capable of reaching even the paging receiver 100 is transmitted. Frequencies F5, F4, F6, F7 and FB are the channel frequencies for transmitting the NID. For example, in the area A, the channel frequency at which the NID1 is transmitted is F4, and in the area B, the channel frequency at which the NID1 is transmitted is F5. The paging receiver 100 performs a process for setting the channel in the receivable service area.

Figure 2:
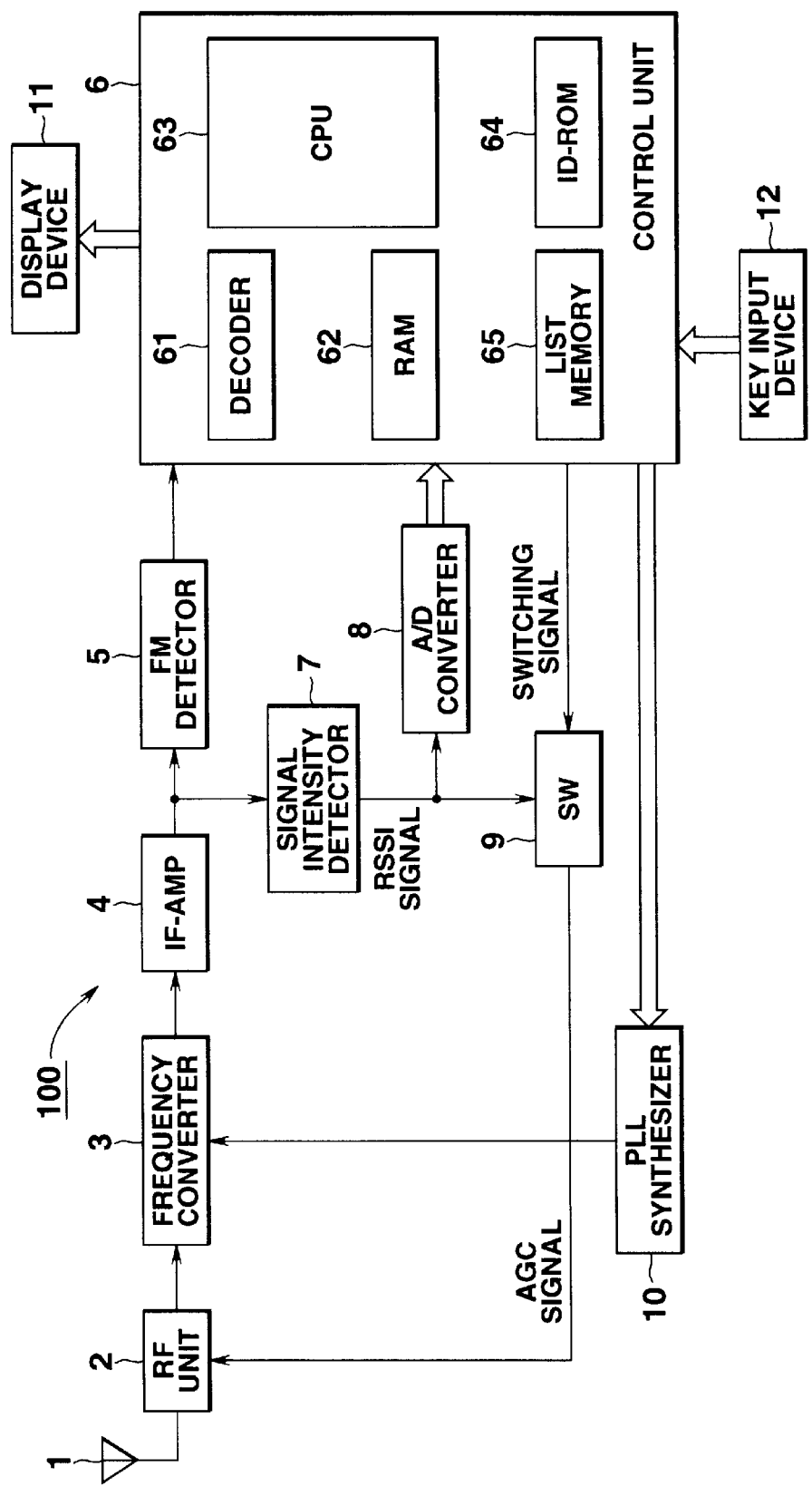
FIG. 2 is a block diagram showing the circuit arrangement of the paging receiver according to the first embodiment.

FIG. 2 shows the circuit arrangement of the above-mentioned paging receiver 100. The radio signal for calling this paging receiver 100 conforms to the high-grade radio paging system and is received by an antenna 1 and sent to an RF unit 2. In the RF unit 2, the radio frequency signal received by the antenna 1 is suitably amplified in accordance with an AGC signal (to be described later) and sent out to a frequency conversion unit 3.

The frequency conversion unit 3 mixes the received radio frequency signal and a local oscillation signal output from a PLL synthesizer 10 to thereby obtain an intermediate frequency (IF) signal. The IF signal is amplified through an intermediate frequency amplifier (IF-AMP) 4 and, thereafter, output to an FM detection unit 5 and a signal intensity detection unit 7.

The FM detection unit 5 detects and demodulates the intermediate frequency signal, which has been sent over through the intermediate frequency amplifier 4, into a binary or four-value digital data and transmits it to a decoder 61 in a control unit 6.

The decoder 61 performs a frame synchronization, on the basis of the control by a CPU 63 in the control unit 6, upon turn-on of the power supply. After the establishment of the synchronization, the decoder 61 is intermittently driven so as to receive only the receiver's own frame on the basis of the frame No. data of this frame and the control signal from the CPU 63 which has taken in this receiver's own frame No. data set to this receiver 100 and fixedly stored in an ID-ROM 64 previously.

The decoder 61 converts the signal of the frame coincident with this receiver's own frame which is demodulated in the FM detection unit 5 into an eight-bit parallel data and transmits the converted data to the CPU 63. When, from the CPU 63, a signal representative of the decision that the address data in the demodulated address field coincides with the address data of the ID code set in the ID-ROM 64 is received, the data of one frame received subsequently is transmitted to the CPU 63.

The CPU 63 controls the operation of this receiver as a whole. The CPU 63 transmits a switching signal to the switch 9, makes the PLL synthesizer 10 output the local oscillation frequency signal, and makes the information received by this receiver, the area information at the time of roaming process (to be described later), etc. be displayed in a display unit 11, and further, receives the signal from a key input unit 12 which sets the received channel frequency when the user moves across service areas.

The signal intensity detection unit 7 detects the signal intensity of the intermediate frequency signal sent from the intermediate frequency amplifier 4 and transmits an RSSI signal, as the detection result, which RSSI signal has a voltage corresponding to the signal intensity, to an A/D conversion unit 8 and the switch 9.

The A/D conversion unit 8 digitalizes, in accordance with a predetermined sampling frequency and a predetermined quantization bit number, the RSSI signal sent from the signal intensity detection unit 7 and transmits it to the CPU 63 in the control unit 6.

The switch 9 is controlled by the switching signal fed from the CPU 63 in the control unit 6 to control the feeding of the RSSI signal from the signal intensity detection unit 7 to the RF unit 2 as AGC signal.

The control unit 6 comprises a RAM 62 and a list memory 65 composed of a RAM other than the RAM 62 in addition to the decoder 61, the CPU 63 and the ID-ROM 64. The RAM 62 has a message store area for storing the received message, a work area for temporarily storing the control data of the CPU 63 etc. and a receiving state setting area for storing a receiving state corresponding to a channel number previously set when a roaming process is performed, FIG. 3 shows the constitution of the receiving state setting area of the RAM 62. The area stores bit rate detection results ("OK"/"NG") and signal intensity detection results (dB μm) corresponding to the channel frequencies n which can be received in the multi-area roaming service. For example, n stands for 36.

FIG. 6 shows the items of the list memory 65 which stores therein the list formed in such a manner that, from the bit rates and the signal intensities of the 36 channel frequencies stored in the receiving state setting area of the RAM 62, those channel frequencies of which have the bit rate detection results are "OK", that is, their bit rates being the bit rates used in the high-grade paging system, and the receiving intensity detection results are higher than a predetermined value such as, 50 (dB μm), are transferred. In addition to the channel frequencies and the signal intensities, the detected frame No, the SSID (LID) and NID, the absence or presence of overlaps, and the frame offset number are stored.

Figure 4:
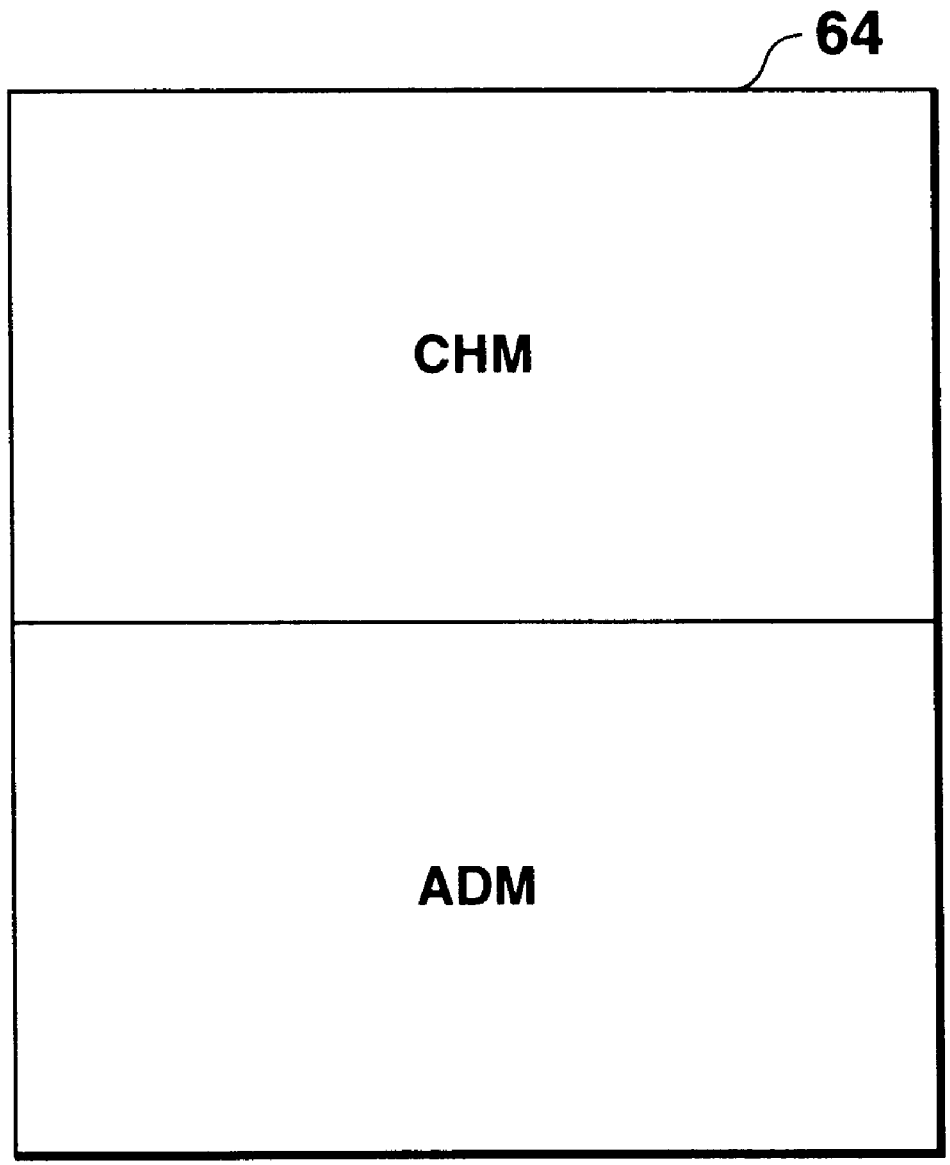
FIG. 4 is a diagram showing the constitution of the memory area of the ID-ROM shown in FIG. 2.

FIG. 4 shows the configuration of memory areas of the ID-ROM 64. The ID-ROM 64 comprises an address memory ADM in which the frame No. data, the address data, etc. for specifying the paging to this receiver are stored, and a channel memory CHM.

Figure 5:
FIG. 5 is a diagram showing the memory contents of the channel memory shown in FIG. 4.

The channel memory CHM is configured as shown in FIG. 5 and stores the channel No. and the channel frequencies in which the NID to be transmitted in the respective areas which are able to receive a multi-roaming service is set, an area code, an area name (display contents), the area No. which is used when area registration is performed, and the address of the NID in a state associating them with one another. For example, FIG. 5 shows the state in which the channel Nos. "4" to "6", the channel frequencies "F4" to "F6", the area codes "A" to "C", the area names "Kanagawa", "Tokyo" and "Chiba", the area Nos. "140", "130" and "120" and the NID address "NID1". The address of the NID has the common contents for the same paging service company.

The operation of the above-mentioned embodiment will be described.

Figure 7:
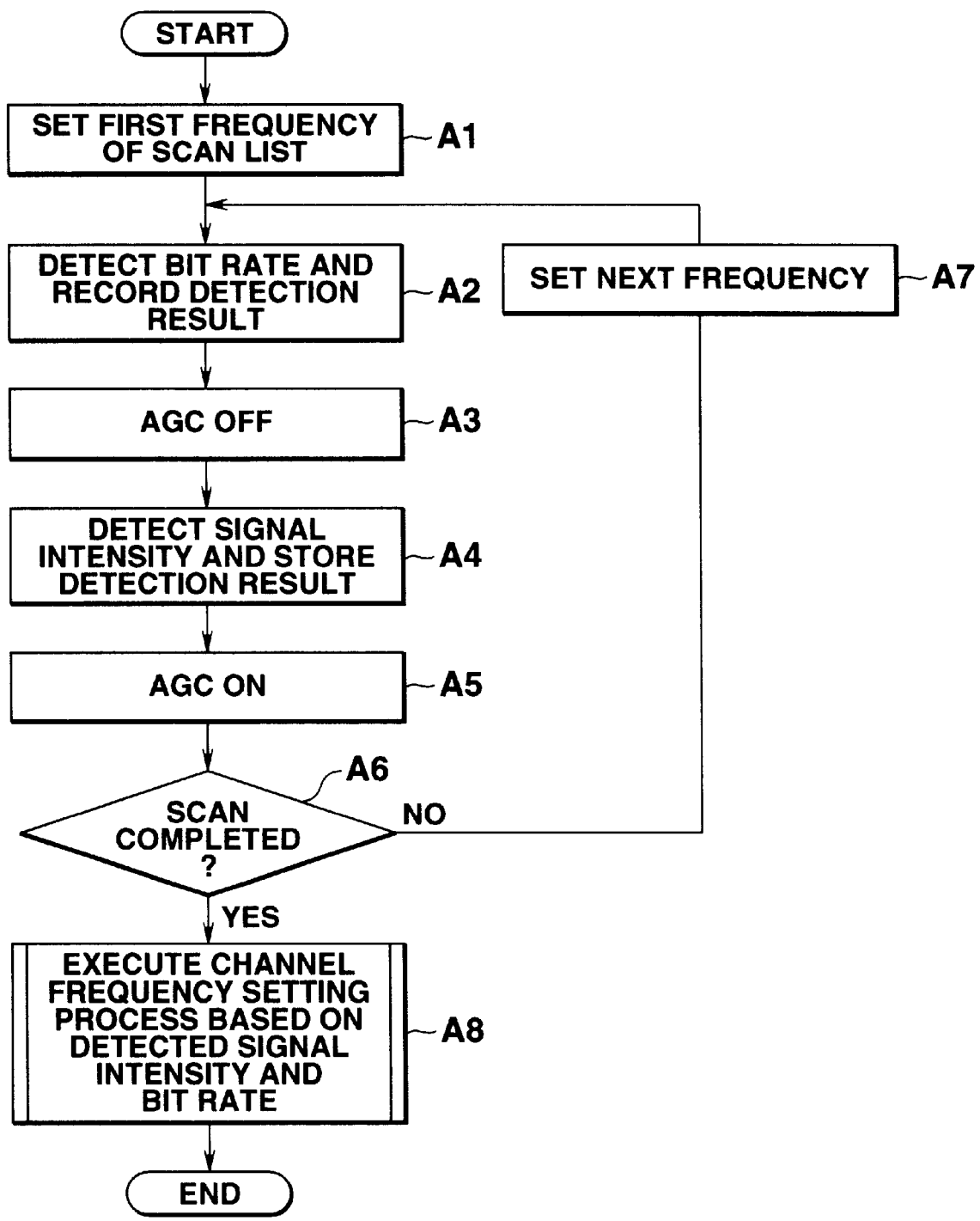
FIG. 7 is a flowchart showing the contents of the roaming process according to the first embodiment.

FIG. 7 shows the flow chart of the roaming process performed when the user is moving through service areas. The control thereof is all executed under the CPU 63.

At the beginning, when the receiving area setting mode is set by the manipulation of the key input unit 12, the first channel frequency F1 set in the receiving state setting area of the RAM 62 shown in FIG. 3 is set (step A1), and, in the ordinary receiving state with the switch 9 turned on, reception of the signal is established at the set frequency. By this reception, a bit rate signal with a fixed pulse width is detected, and the result as to whether the signal has been detected or not is stored in the corresponding channel frequency area of the receiving state setting area of the RAM 62 (step A2).

In the state in which the switch 9 is turned off to cut off the supply of the RSSI signal as the AGC signal to the RE unit (step A3), a signal of the channel frequency is received. The RSSI signal obtained from the signal intensity detection unit 7 at this time is digitalized by the A/D conversion unit 8 and stored, as information representative of the signal intensity at the channel, in the corresponding channel frequency area portion of the receiving state setting area of the RAM 62 (step A4).

The switch 9 is turned on again to allow the supply of the RSSI signal as the AGC signal to the RF unit 2 (step A5). After confirming that the scan of the other channel frequencies is yet to be made (step A6), the channel frequency received next is newly set (step A7). The flow returns to step A2 to carry out the processes starting from step A2.

In this way, the processes at steps A2 to A7 are repeatedly executed, and, concerning all the channel frequencies, the absence or presence of the bit rate detection result and the signal intensity are stored in the receiving state setting area of the RAM 62.

FIG. 8 shows the contents of the receiving state setting area of the RAM 62 in this state. Thereafter, if, at step A6, it is determined that the scan of all the frequency channels has been completed, then the process of setting the channel frequency of which the bit rate detected is "OK" and the detected signal intensity is high, and at which a stable reception can be expected, is executed with reference to the receiving state setting area (step A8). Then, the processes shown in FIG. 7 are terminated.

Figure 9:
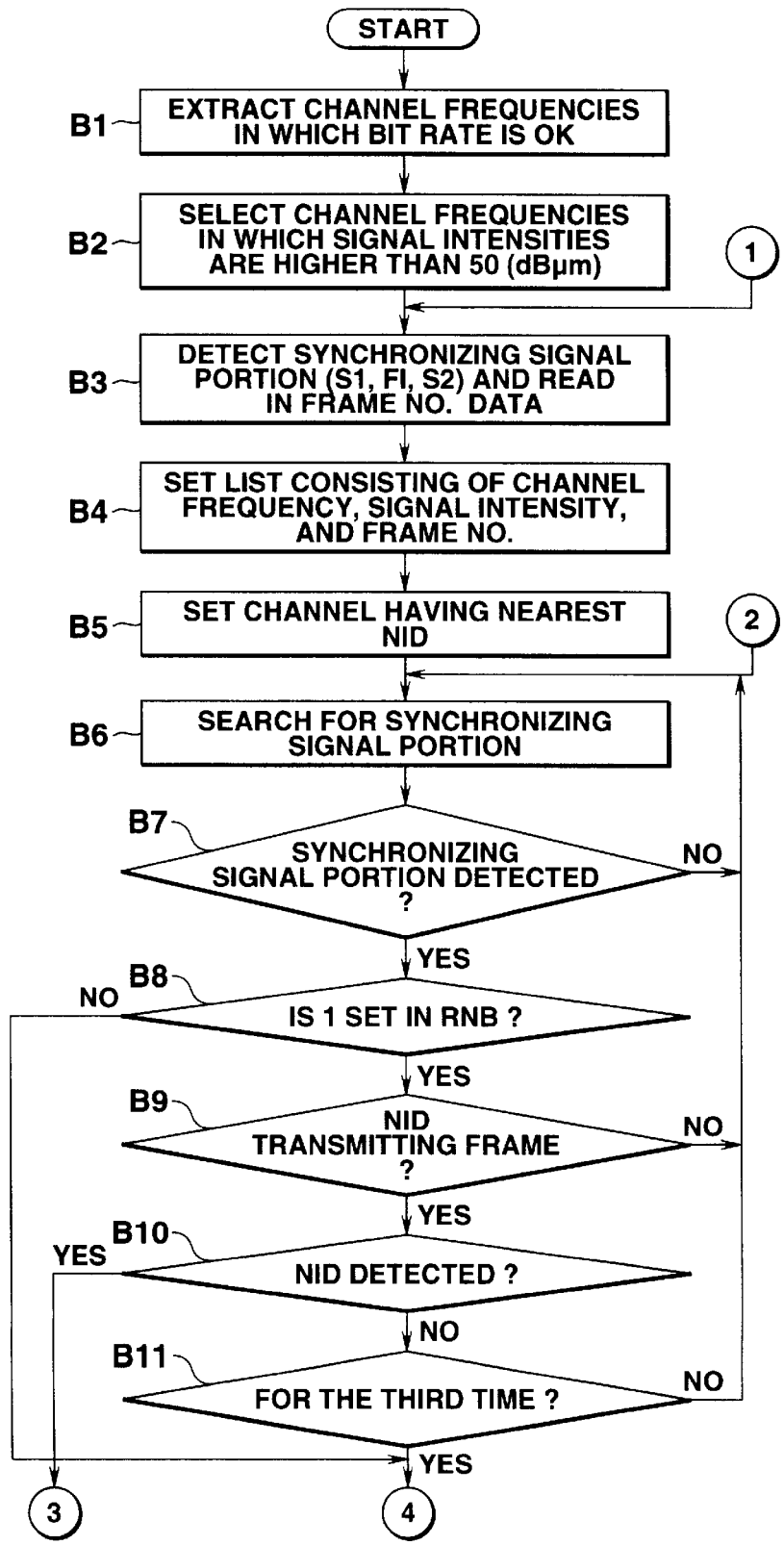
FIG. 9 is a flowchart showing in detail the process of step A8 shown in FIG. 7.
Figure 10:
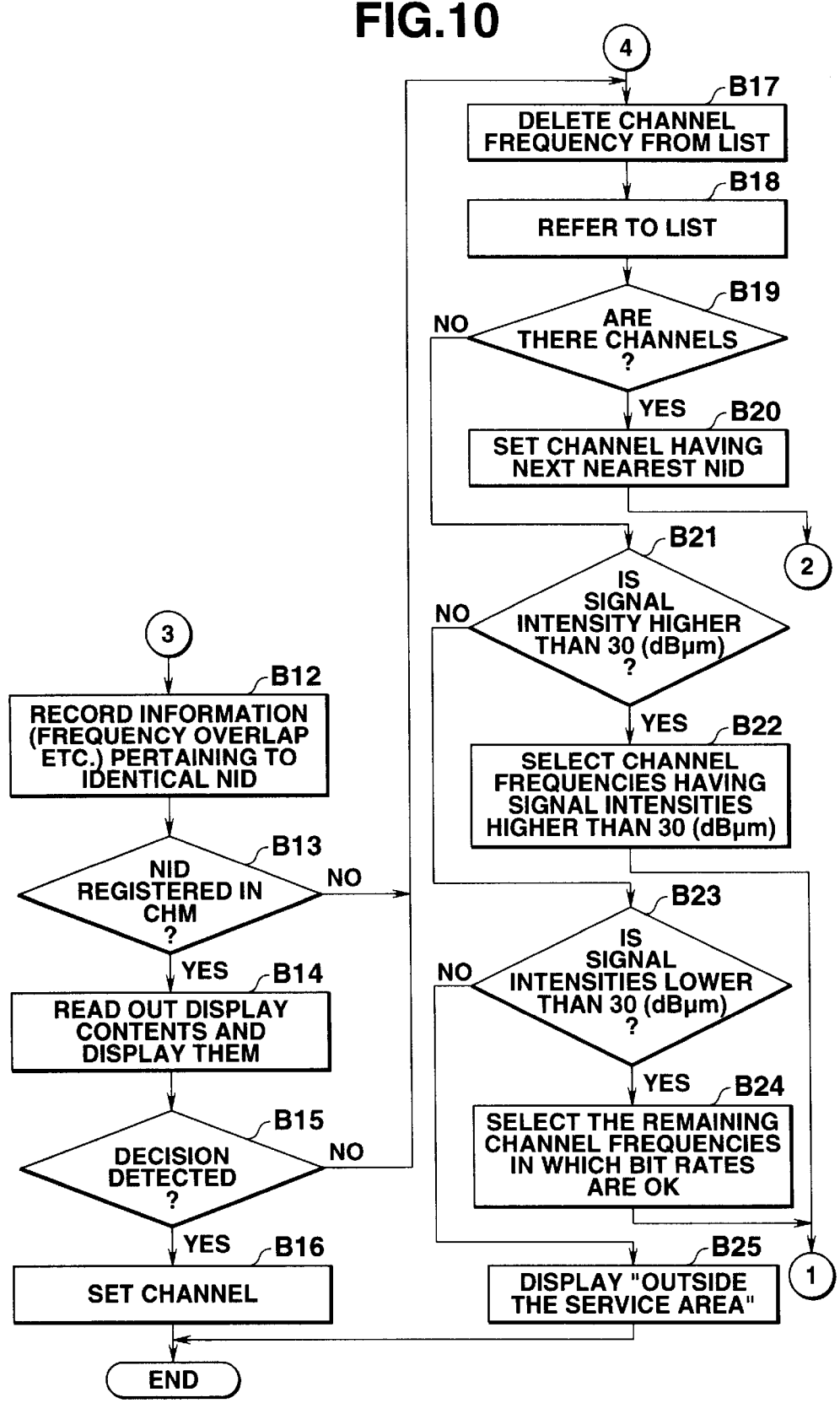
FIG. 10 is a flowchart showing in detail the process of step A8 shown in FIG. 7.

FIG. 9 and FIG. 10 show a series of operations relating to the process of setting the channel frequency with reference to the receiving state setting area. At the beginning, from the receiving state setting area of the RAM 62, those channel frequencies of which the bit rate detection results are "OK" are extracted (step B1). The channel frequencies of which the signal intensity detection results are 50 [dB $\mu$m] or higher are selected, and the channel frequencies and the signal intensities are transferred to the list memory 65 (step B2).

Figure 26:
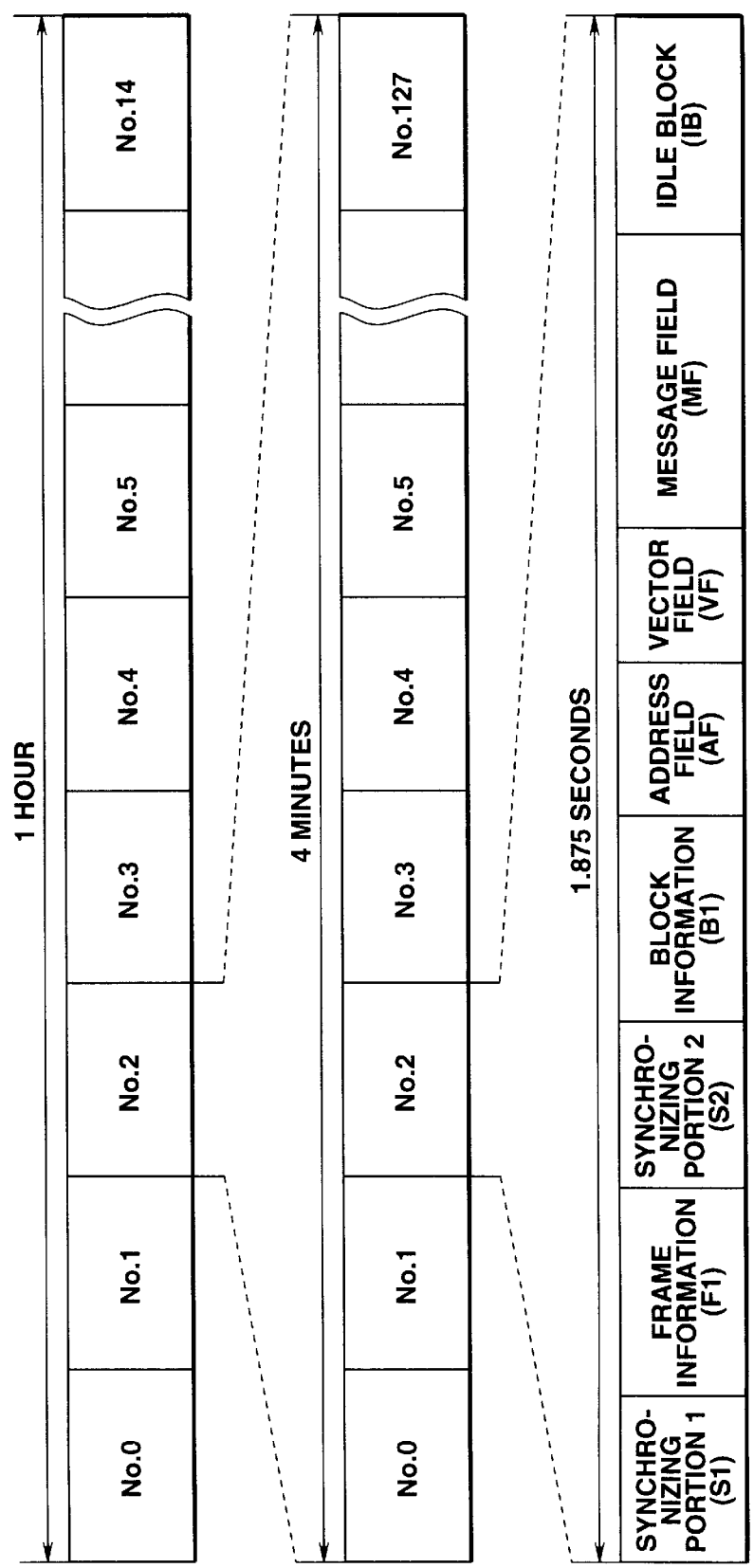
FIG. 26 is a diagram showing the format of the transmitting data in the high-grade radio paging system.

At the respective channel frequencies thus transferred, signals are received until the synchronizing signal portions each consisting of the first synchronizing portion S1, the frame information FI, and the second synchronizing portion S2 shown in FIG. 26 can be detected. The frame No. stored in the frame information FI is read out (step B3). The frame No. data thus read out are stored and set in the list memory 65 (step B4).

FIG. 11 shows the contents thus set in the list memory 65. Of the channel frequencies F4–F6 thus stored, the channel frequency of which the arrival of the NID transmitted over in every 8 frames such as frame Nos. "0", "8", "16", "32", ..., "120" seems to be nearest in reception time is set (step B5).

In the calling method of this embodiment, i.e., high-grade paging service, the frame number "0" of cycle number "0" is synchronized at o'clock and the frame number F in which the NID is transmitted is expressed as follows:

$$F = \text{modulo 8 of } (M+N+C)$$

Here, M is a modulo 8 of an integer part of a division of channel frequency (kHz) by channel interval (kHz), N is a modulo 8 of the network address, and C is the cycle number.

Therefore, the channel frequency in which the desired NID is received earliest can be detected among the searched frequencies based on the current time and the searched frequencies. If the searched frequencies contain a channel frequency having a frame offset, it is necessary to amend the frequency based on a time corresponding to the offset before detecting the channel frequency.

At this channel frequency, signal reception is started, and, after the synchronizing signal portion consisting of the first synchronizing portion S1, the frame information FI, and the second synchronizing portion S2 is searched for again (step B6), it is determined whether or not the synchronizing signal portion has been detected (step B7). If it is determined that the synchronizing signal portion has been detected, then it is determined whether or not "1" is set as the roaming network bit RNB in the frame information FI in the detected synchronizing signal portion (step B8).

If it is determined that "1" is set as the roaming network bit RNB, then it is determined that, the multi-area roaming service is executed at this channel frequency, and it is further determined whether or not the transmitted frame is the NID transmitting frame based on the frame No. data (step B9). If it is determined that the transmitted frame is the NID transmitting frame, it is determined whether or not the NID could actually be detected from the address field AF (step B10).

If it is determined that the NID could be detected, then, as information concerning the NID determined to be coincident, this NID, together with the SSID1 and SSID2 containing the LID extracted from the second to fourth code words of the block information BI of the corresponding frame, the absence or presence of overlaps, and the frame offset number, is stored in the corresponding channel frequency section of the list memory 65 (step B12). It is determined whether or not, the NID is registered in the channel memory CHM of the ID-ROM 64 shown in FIG. 5 (step B13).

If it is determined that the NID is registered in the channel memory CHM of the ID-ROM 64, the area name corresponding to the channel are read out from the channel memory CHM and displayed in the display unit 11 (step B14).

Figure 12:
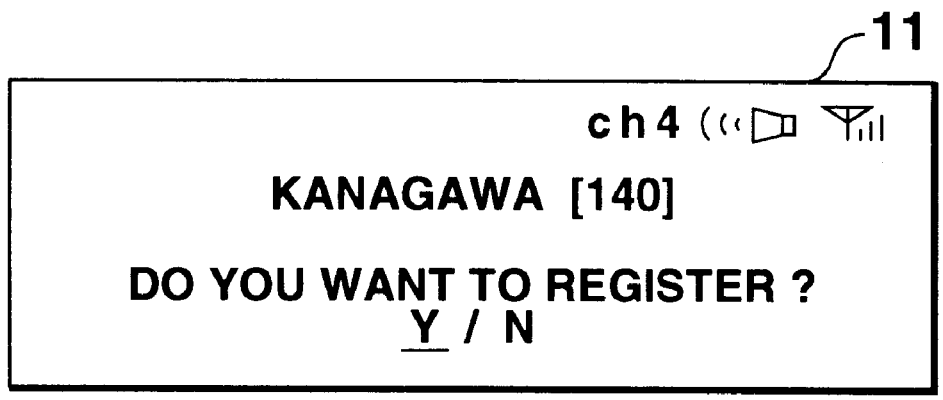
FIG. 12 is a diagram showing the display during the operation according to the first embodiment.

FIG. 12 shows the state of display in the display unit 11. Here, a signal is received in a very good receiving state at the channel frequency F4 (ch4); it is displayed that the channel frequency is that from the exchange at "Kanagawa" of the area No. "140".

At step B15, depending on whether or not a decision instruction is made by a key manipulation in the key input unit 12 in the state in which, in response to the message "Do you want to register?" displayed, "Y (YES)" put therebelow is displayed with an underline in FIG. 12, it is determined whether or not the decision of the channel has been detected (step B15). If it is determined that the decision has been detected, then the receiving channel is set so as to receive the signal at the channel frequency (step B16), with which the processes shown in FIG. 9 and FIG. 10 are terminated. While, on the other hand, the user transmits to the exchange station in this service area the service code of the multi-area roaming service, the password No. previously set through the exchange in the service area, and the area No. are transmitted from the nearest telephone terminal, thus completing the registration.

If, at the above-mentioned step B8, it is determined that the roaming network bit RNB "1" is not set in the frame information FI, it is determined that the multi-area roaming service is not being executed at this channel frequency. At step B17, the data of the corresponding channel frequency is deleted from the list memory 65.

If it is determined, at step B7, that no synchronizing signal portion could be detected and if it is determined, at step B9, that the frame is not the NID transmitting frame, the flow returns to step 6, to carry out the processes starting from the process of searching for the synchronizing signal portion at the channel frequency, again.

It is determined, at step B10, that the NID could not be detected from the address field AF though the received frame is the NID transmitting frame, it is confirmed that it is less than three times that the phenomenon that "the NID could not be detected though the frame received at the channel frequency is the NID transmitting frame" has occurred (step B11). Thereafter, the flow returns to step B6 for retry, thus carrying out the processes starting from the process of searching for the synchronizing signal portion again.

If it is determined, at step B11, that the phenomenon that "the NID could not be detected though the frame received at the channel frequency is the NID transmitting frame" has occurred for the third time, then it is judged that the NID is not transmitted at the channel frequency, and the data of the channel frequency is deleted from the list memory 65 (step B17).

If it is determined, at step B13, that the NID is not registered in the channel memory CHM of the ID-ROM 64 or if, in response to the displayed massage "Do you want to register?", "N (NO)" given therebeneath is instructed, and thus, it is determined, at step B15, that the receiving channel has not been determined, the data of the channel frequency is likewise deleted from the list memory 65 at step B17.

Thereafter, it is determined whether or not there is any other channel frequency of which the signal intensity detection result is higher than 50 [dB $\mu$m] (step B19). If there are some such channel frequencies, the channel frequency of the channel frequencies at which the arrival timing of the NID seems to be nearest is set (step B20), and then, the operation starting from step 6 is executed again.

In this way, those other channel frequencies at which the arrival timing of the NID seems to be near are set and a similar process is performed. Eventually, the channel frequencies stored in the list memory 65 are deleted without setting the channel, and if it is determined, at step B19, that any other channel frequency does not exist any more in the list memory 65 thus subjected to deletion, then the condition that "the signal intensity detection result is higher than 50 [dB $\mu$m] or higher" so far used is lowered in level of the condition "the signal intensity detection result is higher than 30 [dB $\mu$m] or higher. Thereafter, it is determined, from the receiving state setting area of the RAM 62, whether or not there are channel frequencies of which the bit rate detection result is "OK" and the signal intensity detection result is 30 [dB $\mu$m] or higher (step B21). If it is determined that there is such a channel frequency, the channel frequency is selected, and the channel frequency and the signal intensity are transferred to the list memory 65 (step B22). The flow returns to step B3 again, so that reception processing is continued at the respective channel frequencies thus transferred until the synchronizing signal portion can be detected, the frame No. data stored in the respective frame information FI are read out, and the frame No. data thus read out are stored and set in the corresponding channel frequency area of the list memory 65.

After this, as in the case where the signal intensity detection result is higher than 50 [dB $\mu$m], search is made for those channel frequencies of which the NID can be detected in accordance with the list memory 65. If there is one, then the channel frequency is displayed in the display unit 11, and a decision instruction is detected. When the decision is detected, the receiving channel is set under the assumption that a signal is received at the channel frequency.

If the NID could be detected but no decision instruction was not detected, or if the NID could not be detected three times successively, the candidates for the channel frequency corresponding are successively deleted from the list memory 65. If it is determined that any other channel frequency does not remain in the list memory 65, the hitherto used condition that "the signal intensity detection result is 30 [dB $\mu$m] or higher" is lowered to the lower-level condition that "the signal intensity detection result is lower than 30 [dB $\mu$m]. Thereafter, from the receiving state setting area of the RAM 62, it is determined whether or not there is a channel frequency of which the bit rate detection result is "OK" and the signal intensity detection result is lower than 30 [dB $\mu$m] (step B23). If it is determined that there are some, the channel frequency of which the bit rate detection result is "OK" is selected from the channel frequencies, and the channel frequency and the signal intensity thereof are transferred to the list memory 65 (step B24). Then, the flow returns to step B3 again, and thus, signal reception is continued at the respective transferred frequencies until the synchronizing signal portion can be detected. The frame No. data stored in each frame information FI are read out, and the frame No. data are stored and set in the corresponding channel frequency area of the list memory 65.

After this, as in the case where the signal intensity detection result is higher than 50 [dB $\mu$m] and as in the case where the signal intensity detection result is higher than 30 [dB $\mu$m], those channel frequencies of which the NID is detectable are searched for in accordance with the contents of the list memory 65, so that, if there is one, then it is displayed in the display unit 11 and then the decision instruction is detected. When the decision is detected, the receiving channel is set under the assumption that a signal can be received at the channel frequency.

If the NID is detectable, but no decision instruction was not detected or if the NID could not be detected three times successively, the candidates for the channel frequency are deleted from the list memory 65; and, if it is determined at step B19 that no other channel frequency exists any more in the list memory 65, then the flow proceeds to step B23 through step B21. In this case, since any channel frequency of which, in the lower-level conditions, the bit rate detection result which is "OK" does not exist in the receiving state setting area of the RAM 62, the user cannot receive the paging service at the channel frequencies of any signal intensity. Thus, it is determined that this paging receiver 100 is out of any service area, and a message to the effect that this paging receiver is outside the range of service areas is displayed on the display unit 11 (step B25). Then the processes shown in FIG. 9 and FIG. 10 are terminated.

As stated above, according to the first embodiment, the signal intensities at the respective channel frequencies are scanned beforehand, and it is determined step-wise whether or not a signal can be surely received at the channel frequency ranging from the channel frequency having the highest signal intensity to the channel frequencies having lower signal intensities. Therefore, the length of time required for the receiving roaming process which has been one minute or longer in the conventional process can be substantially shortened to about 18 seconds, and in turn, the feeling of uneasiness at the user is eliminated, and the period of time during which the user can receive no paging service can be shortened as much as possible; and even when the user moves from one service area to another, it is possible to quickly shift into a state ready for receiving the paging service.

Other embodiments of the receiver device according to the present invention will be described. The same portions as those of the first embodiment will be indicated in the same reference numerals and their detailed description will be omitted.

Second Embodiment

In the first embodiment, the bit rate detection and the signal intensity detection are performed with respect to all the 36 channels at the time of the roaming process, but it is possible to alter the embodiment in which the signal intensity detection is performed with respect to only those of the 36 channels of which the bit rate detection is "OK".

The second embodiment in which the present invention is applied to a paging receiver 100 will now be described.

As for the state of the paging receiver 100 in a certain service area, it is to be understood that, in the second embodiment, the paging receiver 100 is in the same state as in the case shown in FIG. 1, and, as for the constitution of the paging receiver 100, it is the same as that shown in FIGS. 2 to 6, so that the same component portions are referenced by the same reference numerals, whereby the repetition of the description thereof is omitted.

In the case of the processing described in connection with FIG. 7, merely the result, "OK"/"NG", of whether or not the detection of the bit rates could be made is stored in the receiving state setting area of the RAM 62. However, in this embodiment, a processing in which "whether or not the detected bit rate is the value desired by this receiver 100" is taken into consideration is carried out.

Figure 13:
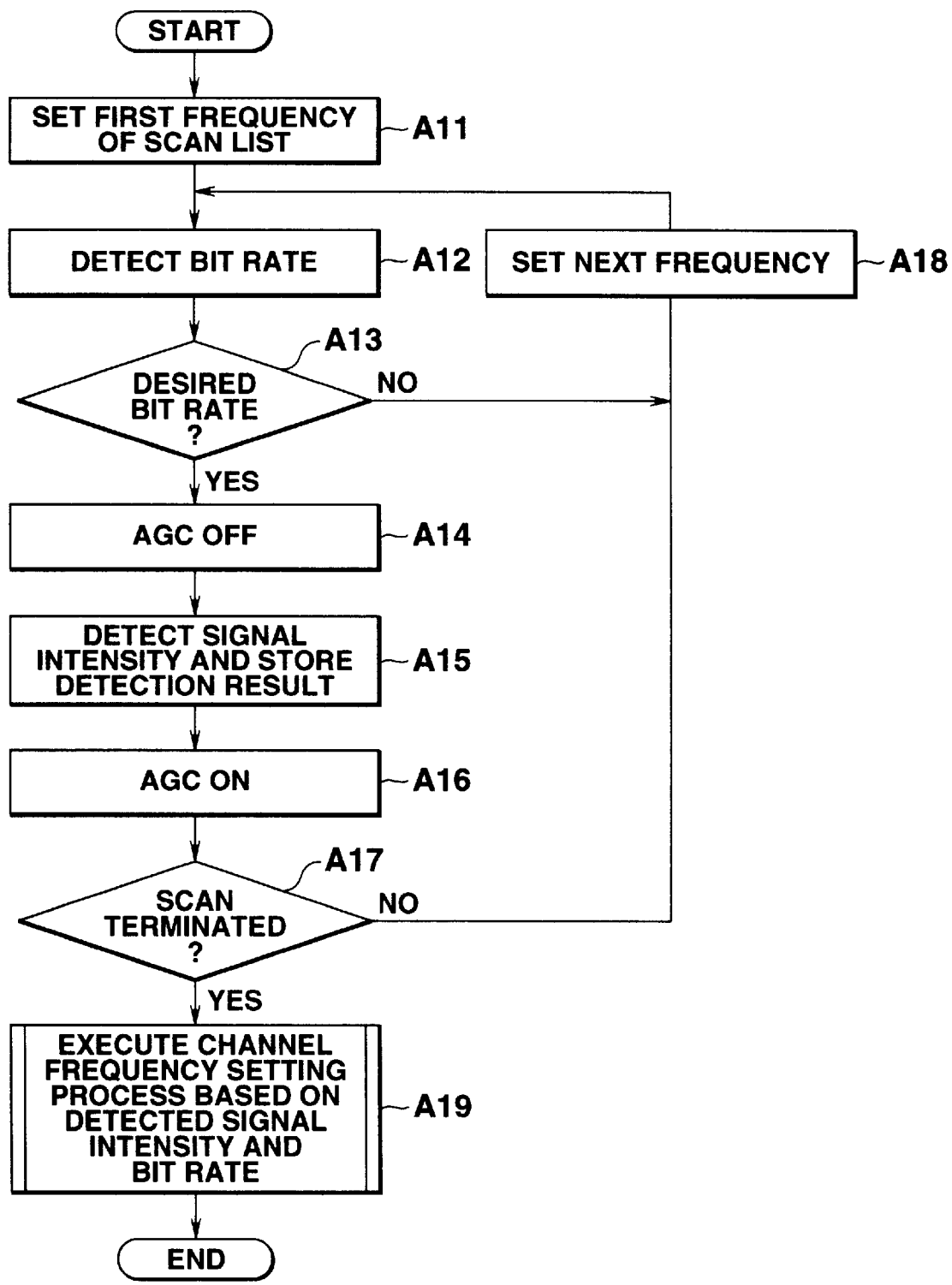
FIG. 13 is a flowchart showing the roaming process according to a second embodiment.

FIG. 13 shows the roaming process according to the second embodiment. At the beginning at which, by the manipulation of the key input unit 12, the receiving area setting mode is set, the first channel frequency F1 which is set in the receiving state setting area of the RAM 62 is set (step A11). In the ordinary receiving state in which the switch 9 is turned on, the synchronization at the set channel frequency is executed, a bit rate signal with a fixed pulse width is detected, and the detection result is stored in the part, corresponding to the particular channel frequency, of the receiving state setting area of the RAM 62 (step A12).

Subsequently, it is determined whether or not the detected bit rate signal has the value desired by the receiver 100, that is, the bit rate used in the highgrade radio paging system (step A13). Only if it is determined that the detected bit rate has the desired value, the switch 9 is turned off to cut off the supply of the RSSI signal as AGC signal to the RF unit 2 (step A14). A signal is received at the same channel frequency, in which the RSSI signal obtained from the signal intensity detection unit 7 is digitalized by the A/D conversion unit 8 and stored in the part, corresponding to the channel frequency, of the receiving state setting area of the RAM 62 as information representative of the signal intensity of the channel frequency (step A15).

Thereafter, the switch 9 is again turned on to supply the RSSI signal as AGC signal to the RF unit 2 (step A16). After it is confirmed that other channel frequencies to be scanned are left (step A17), the next channel frequency is newly set (step A18), and then, the flow returns to the process at step A12.

If it is determined at step A13 that the detected bit rate signal is not the value desired by the receiver 100, the flow proceeds to step A18, omitting processes at steps A14 to A17.

The processes at steps A12 to A18 are thus repeatedly executed, and the values of the detected bit rate signals and the detected signal intensities with reference to all the channel frequencies are stored in the receiving state setting area of the RAM 62. Thereafter, if it is determined, at step A17, that the scan of all the channel frequencies has been completed, then the process of setting the channel frequency at which the signal intensity is high and stable reception can be performed at the desired bit rate is executed (step A19). Then, the process shown in FIG. 13 is completed.

The channel frequency setting process is the same as that described in connection with FIGS. 9 and 10, and therefore, the description thereof is omitted.

In this way, it is not that merely the result relating to the absence or presence of a bit rate detection is stored in the receiving state setting area of the RAM 62, but the operation processing is performed as the detection result in which "whether or not the detected bit rate is the value desired by this receiver 100", is taken into consideration, whereby it becomes possible to surely receive a paging service at the channel frequency corresponding to the desired bit rate.

The second embodiment may be modified in which the roaming process is executed in such a manner that, after the detection of the signal intensities at all the 36 channel frequencies is executed, only those channel frequencies of which the signals can be surely received, that is, the signal intensities thereof are higher than a predetermined value are selected to perform the bit rate detection thereof.

Third Embodiment

A third embodiment in which the present invention is applied to a paging receiver 100 utilizing the paging service based on a high-grade radio paging system will be described.

Figure 14:
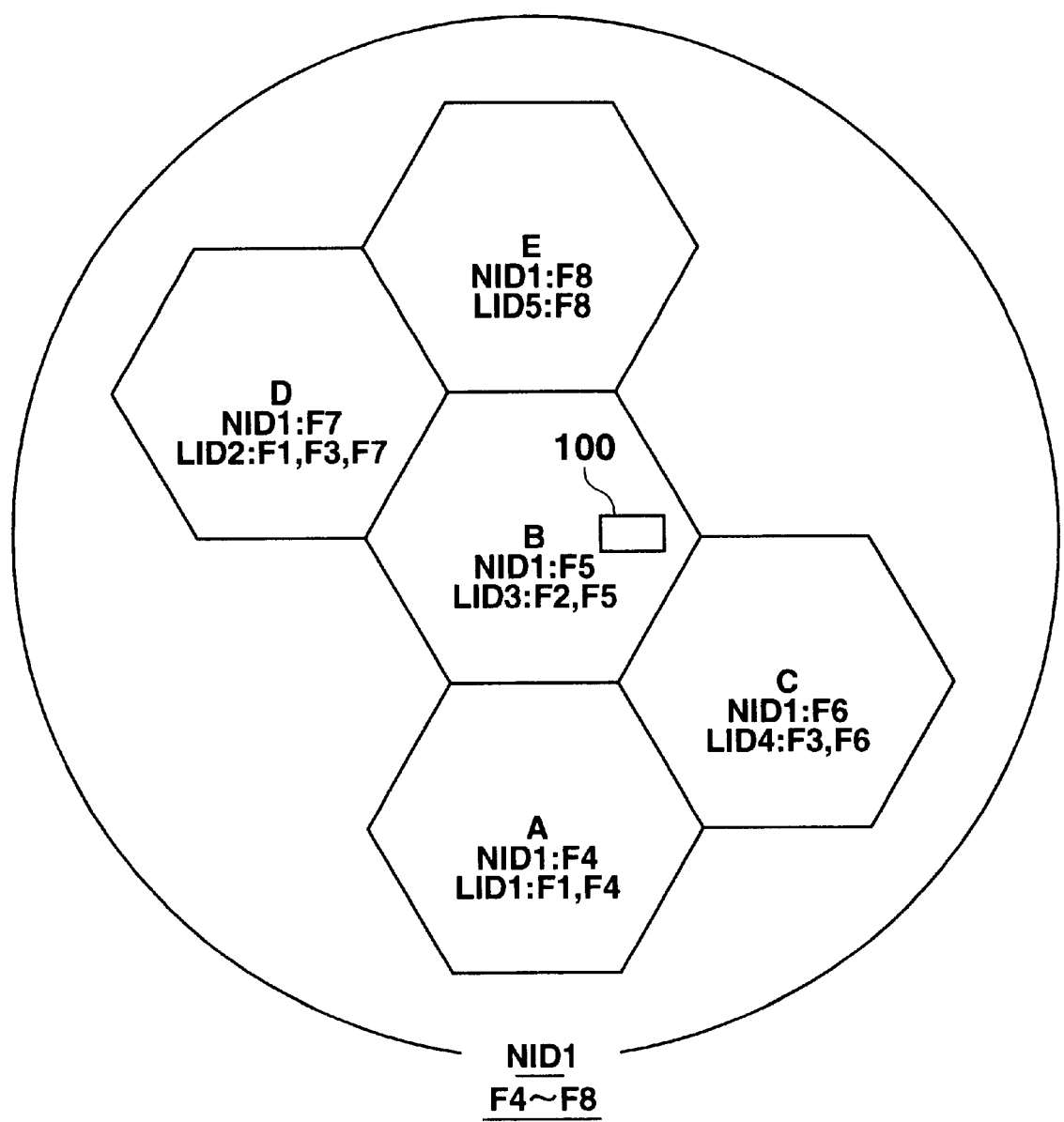
FIG. 14 is a diagram showing how the service areas according to a third embodiment are located adjacent to one another.

FIG. 14 shows a service area B in which the paging receiver 100 is located at present and the service areas A, C, D and E which are located adjacent to the service area B and in which the same NID which can reach the paging receiver 100, that is, the NID1 is transmitted, wherein the channel frequencies at which the NID and LID are transmitted are also shown. For instance, in the area A, the channel frequency at which the NID1 is transmitted is F4, and the channel frequencies at which the LID1 is transmitted are F1 and F4; in the area B, the channel frequency at which the NID1 is transmitted is F5 and the channel frequencies at which the LID3 is transmitted are F2 and F5. The paging receiver 100 performs the process for setting the channel frequency of a service area, of the areas shown, where signal reception is possible.

The constitution of the paging receiver 100 is the same as that shown in FIGS. 2 to 4 and FIG. 6, so that the same component portions are referenced by the same reference numerals and symbols, whereby the repetition of the description thereof is omitted.

Figure 15:
FIG. 15 is a diagram showing the channel memory according to the third embodiment.

FIG. 15 shows a table stored in the channel memory CHM of the ID-ROM 64, which is used when the user receives the multi-roaming service using the NID and LID. Here, in this case, by the NID, the respective service areas are designated, and by the LID, the respective service areas are divided into smaller portions.

In the table, the channel No., the channel frequency, the local channel ID (LID), the network ID (NID), the area code, the area name (the display contents), and area No. used at the time of making an area registration are stored in a manner associating them with one another. The user of the paging receiver 100 can receive the services of ten divided service areas by setting channel frequencies F1–F8 in five service areas "A"–"E".

Next, the operation of the above-mentioned embodiment will be described below.

The flow of the whole roaming process carried out under the control of the CPU 63 when the user is moving through service areas is the same as that described in connection with FIG. 7, and thus, the illustration and description thereof are omitted.

FIG. 16 shows the results relating to the absence or presence of the bit rate detection and the signal intensities which are stored in the receiving state setting area of the RAM 62, with reference to all the channels such as, 36 channels.

After the storage into the receiving state setting area of the RAM 62 is completed as shown in FIG. 16, the process of setting the channel frequency which can assure a stable reception is executed in accordance with the bit rate detection result and the magnitudes of the signal intensities detected with reference to the receiving state setting area of the RAM 62.

Figure 18:
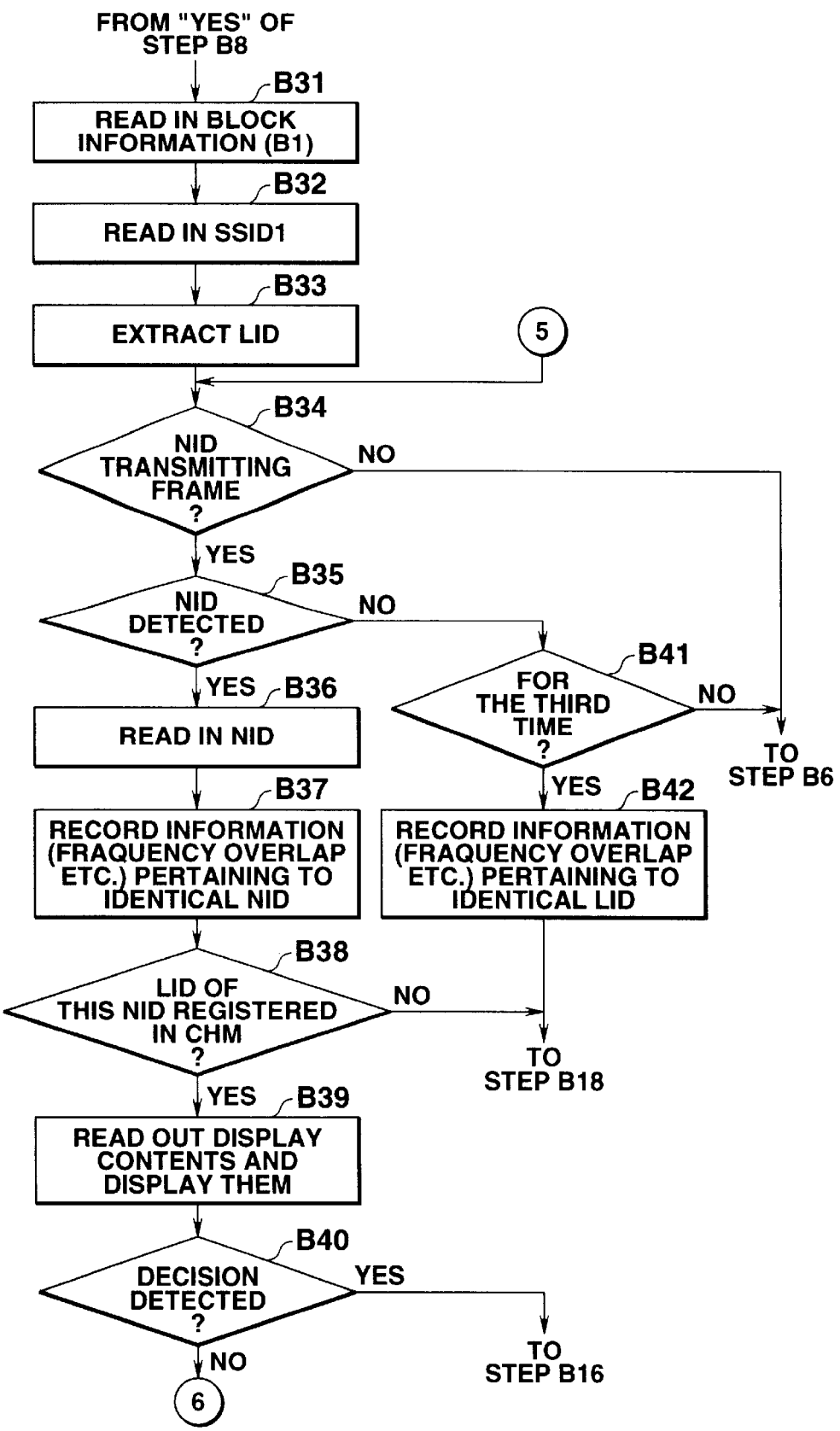
FIG. 18 is a flowchart showing in detail the process according to the third embodiment.
Figure 19:
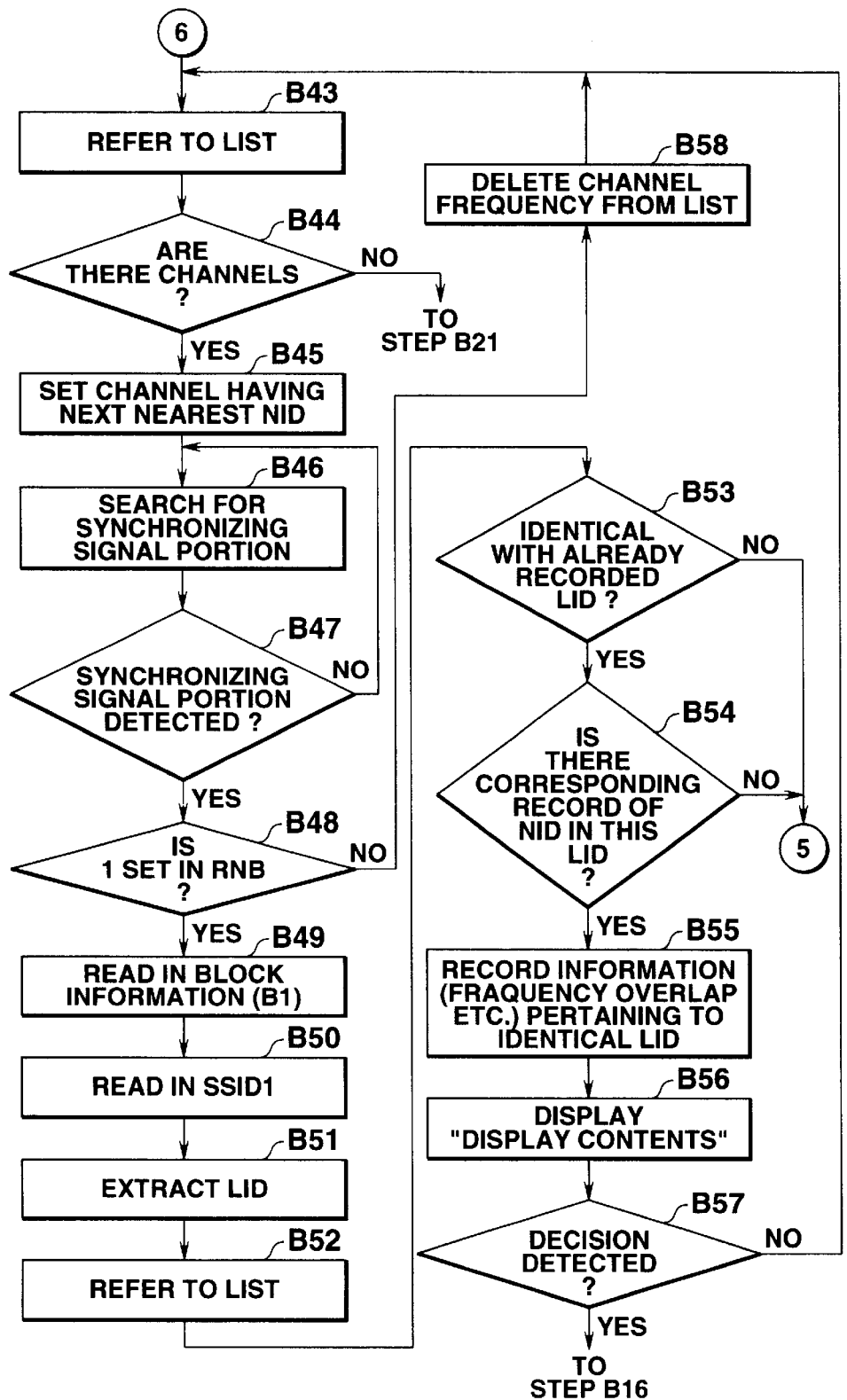
FIG. 19 is a flowchart showing in detail the process according to the third embodiment.

FIGS. 18 and 19 show a series of operations relating to the channel frequency setting process performed with reference to the receiving state setting area. A portion of this process is the same as the process described above in connection with FIGS. 9 and 10, so that the same portions as those shown in FIGS. 9 and 10 are not shown here but, by using the same step numbers, they will be described.

At the beginning, those channel frequencies of which the bit rate detection results are "OK" are extracted from the receiving state setting area of the RAM 62 (step B1). Those of which the signal intensity detection results are higher than 50 [dB μm] are selected, and these channel frequencies and the signal intensities are transferred to the list memory 65 (step B2). At the respective channel frequencies thus transferred, a signal is continuously received until the synchronizing signal portion consisting of the first synchronizing portion S1, the frame information FI and the second synchronizing portion S2 can be detected; and the frame No. data stored in this frame information FI is read out (step B3). The frame No. data thus read out is stored and set in the list memory 65 (step B4).

FIG. 17 shows the contents set in the list memory 65 in this case. Of the channel frequencies F2, F5 and F6 thus stored, the channel frequency—such as, the channel frequency "F6" of the frame No. data 7—of which the arrival timing of the NID transmitted in every 8 frames such as, frame Nos. "0", "8", "16", "32", . . . , "120" seems to be nearest, is set (step B5).

Then, at this channel frequency, signal reception is started, and, after the synchronizing signal portion consisting of the first synchronizing portion S1, the frame information FI, and the second synchronizing portion S2 is searched for (at step B6), it is determined whether the synchronizing signal portion could be detected (step B7). If it is determined that the synchronizing signal portion could be detected, then it is determined whether or not "1" is set as the roaming network bit RNB in the frame information FI in the synchronizing signal portion thus detected (step B8).

If it is determined that "1" is set as the roaming network bit RNB, then it is determined that the multi-area roaming service is being provided at the channel frequency, the block information BI in this frame is read in (step B31). Of the block information BI thus read in, the SSID1 set in the second to the fourth code words is read in (step B32). Thereafter, the LID is extracted therefrom (step B33).

Thereafter, from the frame No. data of the frame, it is determined whether or not the frame is the NID transmitting frame which appears every 8 frames (step B34), and, only if it is determined that the frame is the NID transmitting frame, it is determined whether or not the NID could be detected from the address field AF actually (step 35).

If it is determined that the NID could be detected, then the thus detected NID is read in (step B36). Thereafter, the information relating to the NID, that is, the absence or presence of the overlap of the NID on the SSID1 and SSID2 including the LID extracted, and the frame offset number are stored, together with the NID thus detected, in the corresponding channel frequency section of the list memory 65 (step B37). Thereafter, it is determined whether or not the NID and the LID are respectively registered in the channel memory CHM of the ID-ROM 64 shown in FIG. 15 (step B38).

If it is determined that the corresponding NID and LID are both registered in the channel memory CHM of the ID-ROM 64, the display contents corresponding to the NID and LID are read out from the channel memory CHM and displayed in the display unit 11 (step B39).

FIG. 20 shows the state in which, after it is determined, at step B35, that the NID1 could be detected as the NID, the thus detected NID1 is read in at step B36, and further, at step B37, the information relating to the NID1, that is, the information relating to the absence or presence of any overlap of the NID1 on the SSID1 and SSID2 including the LID4 already detected and the frame offset number "0" are stored, together with the detected NID1, in the corresponding channel frequency section of the list memory 65.

In this case, it is determined, at step B38, that the NID1 and LID4 are both registered in the channel memory CHM of the ID-ROM 64 shown in FIG. 15, and, at step B39, the display contents corresponding to the NID1 and the LID4 are read out from the channel memory CHM and displayed in the display unit 11.

Figure 23:
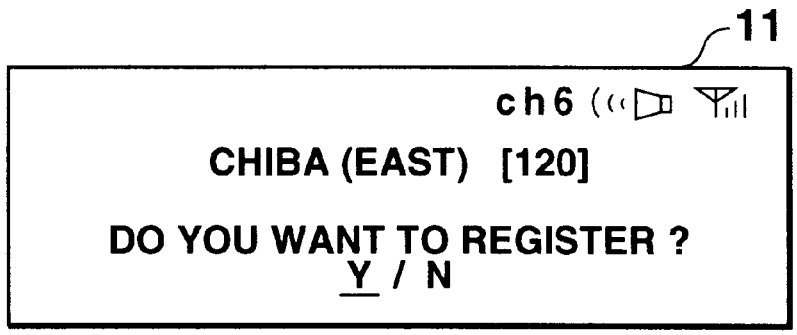
FIG. 23 is a diagram showing the display during operation according to the third embodiment.

FIG. 23 shows the displayed state of the display unit 11 in this case, wherein a signal is received at the channel frequency F6 (ch6) in a very good receiving state, and the channel frequency is supplied from the exchange at "Chiba (Eastern Area)" of the area No. "120".

Depending on whether or not the decision instruction is made by a key manipulation in the input unit 12 in the state in which, as shown, in response to the message "Do you want to register?", "Y (YES)" given therebeneath is cursor-indicated as shown by an underline, it is determined whether or not the decision of the channel was detected (step B40). If it is determined that the decision was detected, the receiving channel is set under the assumption that a signal is received at this channel frequency (step B16). The processes shown in FIG. 18 and FIG. 19 are completed, while on the other hand, the user transmits through the nearest telephone set the service code of the multi-area roaming service, the password number previously determined through the exchange in this service area, and the area No. to the exchange in the service area, whereby the registration of the service area is completed.

If it is determined, at step B34, that the corresponding frame is not the NID transmitting frame, the flow returns to step B6, performing the process starting from the search for the synchronizing signal portion at the channel frequency again.

If it is determined, at step B35, that the NID could not be detected from the address field AF though the received frame is the NID transmitting frame, it is confirmed that the phenomenon that "the NID could not be detected though the frame received at the channel frequency is the NID transmitting frame" has not yet been repeatedly caused three times including the preceding similar process (step B41). Thereafter, the flow returns to step B6 for retry, whereby the operation starting from the search for the synchronizing signal portion at the channel frequency is carried out again.

If it is determined, at step 41, that the phenomenon that "the NID could not be detected though the received frame is the NID transmitting frame" has been caused for the third time, the information other than the NID, that is, the absence or presence of overlap thereof on the SSID1 and SSID2 including the LID, and the frame offset number are stored in the corresponding channel frequency section of the list memory 65 (step B42). Thereafter, the flow proceeds to step B18 as in the case where it is determined, at step B38, that the corresponding NID and LID are not registered together in the channel memory CHM of the ID-ROM 64.

It is determined, at step B40, that, in response to the display in the display unit 11, "IN (NO)" is instructed, and thus, it is determined that the detection of the cancellation of the receiving channel decision has been made, it is determined, with reference to the list memory 65, whether or not there are any other channel frequencies which are not received (steps B43 and B44). If there are other channel frequencies, the channel frequency of the channel frequencies of which the arrival timing of the NID seems to be nearest, such as, the channel frequency "F5" of the frame data No. "30" is set (step B45). Thereafter, signal reception is started at the channel frequency, and search is made for the synchronizing signal portion consisting of the first synchronizing portion S1, the frame information FI, and the second synchronizing portion S2 (step B46). Thereafter, it is determined whether or not the synchronizing signal portion could be detected (step B47). If it is determined that the synchronizing signal portion could be detected, then it is determined whether or not "1" is set as the roaming network bit RNB in the frame information FI in the detected synchronizing signal portion (step B48).

It is determined that the multi-area roaming service is not executed at the channel frequency if "1" is not set as the roaming network bit RNB. The data on the channel frequency is deleted from the list memory 65 at step B58. If the synchronizing signal portion is not detected, the signal reception at the channel frequency is continued until the synchronizing signal portion is detected. If the synchronizing signal portion is detected, and if it is determined that "1" is set as the roaming network bit RNB of the frame information FI of the synchronizing signal portion, then the block information BI of the frame is read in (step B49). The SSID1 set in the block information BI thus read in is read in (step B50), and the LID is extracted therefrom (step B51).

In this case, the LID extracted in the reception at the channel frequency "F5" is "LID3", so that, with the thus extracted "LID3", the list memory 65 is referred to (step B52), and it is determined whether or not there is a channel frequency having the LID identical with the extracted LID (step B53).

The LID stored in the list memory 65 is only the "LID4" of the channel frequency "F6" as shown in FIG. 20 and therefore it is determined that the LID is not identical with the "LID3", and the flow returns to step B34 again.

If it is determined, at step B34, that this frame is the NID transmitting frame, then the flow proceeds to step B35, where it is determined whether or not the NID could be detected from the address field AF. If it is determined that the NID could be detected, then the detected NID, that is, the "NID1" is read in at step B36. At step B37, the information relating to the NID, that is, the absence or presence of an overlap thereof on the SSID1 and SSID2 including the LID, and the frame offset number are stored, together with the detected NID, in the corresponding channel frequency "F5" section of the list memory 65. At step B38, it is confirmed by referring to the channel memory CHM of the ID-ROM 64 that the "NID1" and "LID3" are both registered in the channel memory CHM of the ID-ROM 64 shown in FIG. 15. At step B39, the display contents corresponding to the "NID1" and "LID3" are read out from the same channel memory CHM and displayed in the display unit 11.

FIG. 21 shows the state in which the information relating to the NID1 obtained at the channel frequency "F5" at step B37, that is, the respective information on the absence of any overlap thereof on the SSID1 and SSID2 containing the LID3, and the frame offset number "0" are stored, together with the NID1 detected, in the section of the corresponding channel frequency F5 section of the list memory 65.

In this case, at step B38, it is determined that the NID1 and LID3 are both registered in the channel memory CHM of the ID-ROM 64 shown in FIG. 15, and, at step B39, the display contents corresponding to the NID1 and LID3 are read out from the channel memory CHM and displayed in the display unit 11.

Figure 24:
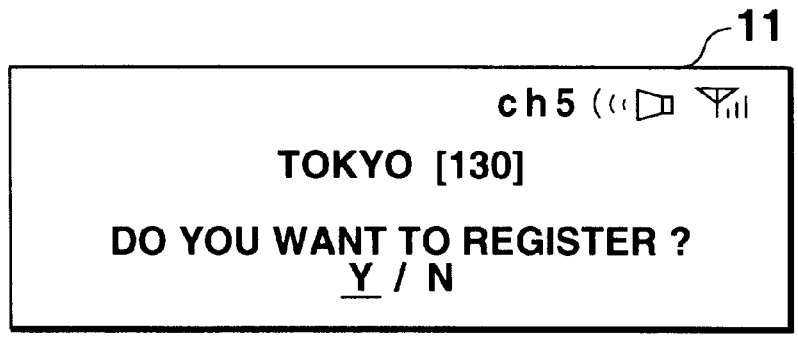
FIG. 24 is a diagram showing the display during operation according to the third embodiment.

FIG. 24 shows the state displayed in the display unit 11 in this case, wherein it is shown that the reception at the channel frequency F5 (ch5) is established in a very good receiving state; and the channel frequency is supplied from the exchange at "Tokyo" of the area No. "130".

Depending on whether or not a decision instruction is made by a key manipulation in the key input unit 12 at step B40 in the state in which, as shown, in response to the massage "Do you want to register?", the "Y (YES)" given therebeneath is cursor-indicated as shown by an underline, it is determined whether or not the decision of the channel was detected. If it is determined that the decision was detected, the receiving channel is set under the assumption that a signal can be received at the channel frequency (step B16). The processes shown in FIG. 18 and FIG. 19 are terminated, while on the other hand, the user transmits by the nearest telephone set to the exchange in the service area corresponding the service code of the multi-area roaming service, the password number previously determined through the exchange in the service area, and the area No.

If, at step 40, "N (NO)" is instructed in response to the display on the display unit 11, and it is determined that the cancellation of the decision on the receiving channel was detected, it is determined, by referring to the list memory 65, whether or not there are any other channel frequencies which are not received yet (steps B43 and B44). If there are some, the channel frequency of the channel frequencies of which the arrival timing of the NID seems to be nearest, such as, the channel frequency "F2" of the frame No. data "10" is set at step B45. Thereafter, signal reception is started, at step B46, at the channel frequency, and search is made for the synchronizing signal portion consisting of the first synchronizing portion S1, the frame information FI, and the second synchronizing portion S2 again. At step B47, it is determined whether or not the synchronizing signal portion could be detected; and if it is determined that the synchronizing signal portion could be detected, then it is determined, at step B48, whether or not "1" is set as the roaming network bit RNB in the frame information FI in the synchronizing signal portion detected.

If "1" is not set to the roaming network bit RNB, it is determined that, at the channel frequency, the multi-area roaming service is not executed, and, at step B58, the data of the channel frequency is deleted form the list memory 65. If the synchronizing signal portion is not detected, the signal reception at the channel frequency is continued until the synchronizing signal portion is detected. If the synchronizing signal portion is detected, and it is determined that "1" is set in the roaming network bit RNB of the frame information F1 of this synchronizing signal portion, then the flow proceeds to step B49. At step B48, the block information BI in the frame is read in, and at succeeding step B50, the SSID1 set in the block information BI read in is read in. At step B51, the LID is extracted therefrom.

In this case, the LID extracted at the reception of the channel frequency "F2" is the "LID3", and thus, at step B53, reference is made to the list memory 65 with the thus extracted "LID3" to decide whether or not there are channel frequencies having the LID identical with this extracted LID (step B53).

Here, the LID stored in the list memory 65 is the "LID3" of the channel frequency "F5" and the "LID4" of the channel frequency "F6", so that it is determined that there are identical ones. Then, it is determined whether or not the NID is stored corresponding to the channel frequency "F5" having the same "LID3" (step B54).

The "NID1" is stored corresponding to the channel frequency "F5", so that decision is made on this. The information concerning the "LID3" which has already determined to be identical is stored, together with other information excepting the NID, that is, the absence or presence of an overlap and the frame offset information, in the section of the channel frequency "F2" under reception at present, of the list memory 65 (step B55). Thereafter, from the channel memory CHM of the ID-ROM 64, the display contents corresponding to the "No NID" and "LID3" are read out and displayed in the display unit 11.

FIG. 22 shows the information concerning the LID3 obtained at the channel frequency "F2" at step B55, that is, the respective information relating to the absence or presence of an overlap thereof on the SSID1 and SSID2 containing the LID3 and the frame offset number "0" are stored together with the information of "No NID" in the corresponding channel frequency F2 section of the list memory 65.

In this case, at step B56, the display contents corresponding to the "No NID" and the "LID3" are read out from the channel memory CHM and displayed in the display unit 11.

Figure 25:
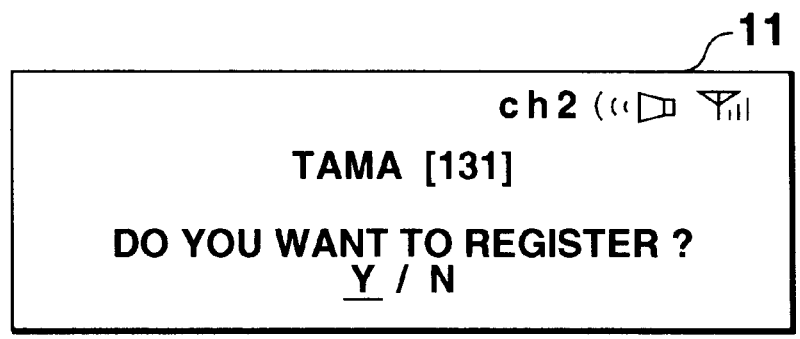
FIG. 25 is a diagram showing the display during operation according to the third embodiment.

FIG. 25 shows the display contents of the display unit 11 at this case; here, it is shown that the signal can be received in every good receiving state at the channel frequency F2 (ch2), and the channel frequency is supplied from the exchange at "Tama" in the area No. "131".

Depending on whether a decision instruction is made or not by a key manipulation of the key input unit 12 in the state in which, in response to the massage "Do you want to register?", the "Y (YES)" put therebeneath is cursor-indicated as shown by an underline, it is determined whether or not the decision on the receiving channel has been detected (step B57). It is determined that the decision has been detected, the flow proceeds to step B16 to set the receiving channel under the assumption that the signal is received at the channel frequency. The processes shown in FIG. 18 and FIG. 19 are completed, while, on the other hand, the user transmits by the nearest telephone set the service code of the multi-area roaming service, the password number previously determined through the exchange in the service area corresponding, and the area No. to the exchange in the service area, whereby the service area registration is completed.

If, at step B57, the "N(NO)" is instructed in response to the display in the display unit 11, and it is determined that the cancellation of the decision on the receiving channel has been detected, the flow returns to step B43, where the list memory 65 is referred to, and then, at step B44, it is determined whether or not there are any other channel frequencies which are not received.

If there are some, the flow proceeds to the process at step B45 again, or if there is none, the operation proceeds to step B21 and the following steps in order to lower the condition level for the candidates to be registered in the list memory 65.

If it is determined, at step B54, that the NID is not stored corresponding to the other channel frequencies which have the same LID, the flow returns to step B34 as in the case where it is determined, at step B53, that, in the list memory 65, there is no other channel frequency having the LID identical with the LID extracted at step B53.

In this way, it is possible to set the channel frequency, without the necessity of waiting for the reception of the NID transmitting frame, only by discriminating between the coincidence or non-coincidence of the LID; and therefore, the length of time required for the roaming process which was about 18 seconds for instance in the above-mentioned first embodiment, can be more substantially reduced to about 2 seconds; and, in turn, the feeling of uneasiness of the user is eliminated, and the length of time during which the user can receive no paging service can be reduced to an almost negligible value, whereby, even while the user is moving through service areas, the receiver can quickly shift into a state ready for the reception of the paging service.

As described above, according to the invention, the speed at which the change of the receiving channel and the registration process are performed when the user is moving across service areas can be enhanced to eliminate the feeling of uneasiness of the user and to reduce as much as possible the length of time during which the user can receive no paging service.

If the frequencies of a plurality of bit rates are set, the bit rate corresponding to the corresponding channel can be detected, and the roaming process can be executed.

The roaming process is executed, starting from the channel having the largest signal intensity, in accordance with the contents stored, whereby the speed at which the roaming process is executed can be enhanced.

The channel information detection is carried out, starting from the channel information which seems to be able to be received earliest, so that the length of time required until the receiving channel is set can be more substantially shortened.

If it is determined that the second channel information (LID) is identical with the second channel information stored together with the first channel information, it is indicated whether or not the second channel information is the channel information of the desired channel, and if it is indicated that the second channel information is the channel information of the desired channel, the channel in which the second channel information is contained is set as the receiving channel; and therefore, the channel information of the desired channel can be set by associating the channel with the second channel information which can receive earlier than the first channel information (NID), so that the length of time required for performing the change of the receiving channel and the registration process when the user is moving across service areas can be further shortened.

The information of the channel which is able to be roamed, that is, information indicative of the effective service area at the particular point of time can be displayed.

The speed at which the change of the receiving channel and the registration process are carried out when the user is moving across service areas can be enhanced to eliminate the feeling of uneasiness of the user; and the length of time during which the user can receive no paging service can be shortened as much as possible.

The speed at which the change of the receiving channel and the registration process are carried out when the user is moving across service areas is enhanced to eliminate the feeling of uneasiness of the user; and the length of time during which the user can receive no paging service is shortened as much as possible.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, according to the first to third embodiments, the bit rate detection and the signal intensity detection are performed with respect to all the paging channels, but it is possible to detect only for the channel frequencies stored in the channel memory CHM. In this case, all the data items stored in the channel memory CHM of the list memory 65, i.e., the channel frequencies, the LID and the NID are read out and stored in the list memory 65. The bit rate detection and the signal intensity detection are performed with respect to the channel frequencies stored in the list memory 65. The detection results are stored in the columns of detection frame Nos. and signal intensities. According to this modification, it is not necessary to provide the receiving state setting area in the RAM 32. Further, it is possible to determine whether or not the NID and the LID detected during the detecting process are the same as those stored in the channel memory CHM based on only the data stored in the list memory 65.

Further, according to the first to third embodiments, the frequency of the channel received is merely set as the receiving channel if the registration is instructed in reply to the inquiry message "Do you want to register?" which is displayed when the detected NID and the detected LID are the same as those stored in the channel memory CHM. It is possible to output data used for registering the roaming service to the paging service center, e.g., the service code of the roaming service, the calling number of the own device, the password and the area number. The output means includes a modem, a DTMF tone generator, an Ir signal generator and a wireless signal generator. If the modem or Ir signal generator are used as the output means, a telephone set used is required to have a function corresponding to the modem or Ir signal generator.

Moreover, the first to third embodiments are described in connection with the case where the present invention is applied to paging receivers utilizing the paging services on the high-grade radio paging system, however it is a matter of course that the present invention is not limited only to such embodiments but can be applied to other receiver devices.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A receiver device capable of changing a receiving channel, comprising:

a receiver having a plurality of receiving channels each adapted to receive a respective channel signal;

a receiving channel search mode setting unit for setting a receiving channel search mode;

a candidate channel detector configured to, when the receiving channel search mode is set by said receiving channel search mode setting unit, determine whether a predetermined bit rate signal is received while scanning the receiving channels of said receiver and to detect candidate channels at which the predetermined bit rate signal is received;

a memory configured to store the candidate channels detected by said candidate channel detector;

a channel information detector configured to select at least one of the candidate channels stored in said memory based on a predetermined priority and to detect channel information included in a received signal of the at least one selected candidate channel; and a received channel setting unit, when the channel information detected by said channel information detector is channel information of a desired channel, the received channel setting unit is configured to set the channel including the channel information of the desired channel as the receiving channel of said receiver.

2. The receiver device according to claim 1, further comprising a signal intensity detector configured to detect signal intensities of the receiving channels, and wherein said received channel setting unit sets the receiving channel of said receiver taking into account the signal intensities detected by said signal intensity detector.

3. The receiver device according to claim 2, wherein said memory stores the candidate channel detected by said channel information detector and the signal intensities detected by said signal intensity detector in association with each other.

4. The receiver device according to claim 1, wherein the channel information is transmitted at a predetermined interval, and the receiver device further comprises a receiving channel detector configured to detect in which receiving channel the channel information is transmitted earliest, and wherein said channel information detector selects the at least one of the candidate channels stored in said memory based on a detection result of said receiving channel detector.

5. The receiver device according to claim 1, which further comprises:

a channel information memory that stores first channel information to be transmitted at a predetermined interval and second channel information to be transmitted at every interval, by associating the first channel information and the second channel information with the receiving channels of said receiver;

a determining device which, when said channel information detector detects the second channel information, determines whether or not the detected second channel information is already stored in the channel information memory;

an instruction device for, when said determining device determines that the detected second channel information is already stored in the channel information memory, evaluating whether or not the detected second channel information is the channel information of the desired channel; and a controller for, when said instruction device evaluates that the detected second channel information is the channel information of the desired channel, controlling the received channel setting unit to set, as the receiving channel, the channel of the detected second channel information.

6. The receiver device according to claim 1, further comprising a display that displays the channel information detected by said channel information detector unit.

7. A receiving channel setting method comprising:

determining whether a predetermined bit rate signal is received while scanning channels and detecting candidate channels at which the predetermined bit rate signal is received;

selecting at least one of the candidate channels based on a predetermined priority and detecting channel information included in a received signal of the at least one selected candidate channel; and setting, when the detected channel information is channel information of a desired channel, the channel including the channel information of the desired channel as the receiving channel.

8. The method according to claim 7, wherein said predetermined order is a descending order of signal intensities.

9. The method according to claim 7, wherein said predetermined order is an order in which the candidate channels transmitting the channel information earliest have a higher priority.

* * * * *